United States Patent [19]

Zheng et al.

[11] Patent Number: 5,418,862
[45] Date of Patent: May 23, 1995

[54] METHOD AND APPARATUS FOR DETECTING ARTIFACT CORNERS IN TWO-DIMENSIONAL IMAGES

[75] Inventors: Joe Zheng; Mihael Klancnik, both of Brookfield, Conn.

[73] Assignee: United Parcel Service of America, Atlanta, Ga.

[21] Appl. No.: 927,909

[22] Filed: Aug. 10, 1992

[51] Int. Cl.⁶ .............................................. G06K 9/00
[52] U.S. Cl. ..................................... 382/199; 235/462
[58] Field of Search ............................ 382/22; 235/462

[56] References Cited

U.S. PATENT DOCUMENTS

| | | | |
|---|---|---|---|
| 4,847,911 | 7/1989 | Morimoto et al. | 382/22 |
| 4,873,426 | 10/1989 | Sarna et al. | 235/462 |
| 4,948,955 | 8/1990 | Lee et al. | 235/462 |
| 4,958,064 | 9/1990 | Kirkpatrick | 235/384 |
| 4,973,829 | 11/1990 | Ishida et al. | 235/462 |
| 4,988,852 | 1/1991 | Krishnan | 235/462 |
| 4,992,650 | 2/1991 | Somerville | 235/462 |
| 5,007,098 | 4/1991 | Kumagai | 382/22 |
| 5,036,182 | 7/1991 | Ouchi et al. | 235/462 |
| 5,045,677 | 9/1991 | Okamura | 235/462 |
| 5,050,222 | 9/1991 | Lee | 382/22 |
| 5,073,954 | 12/1991 | Van Tyne et al. | 382/18 |
| 5,081,689 | 1/1992 | Meyer et al. | 382/22 |
| 5,120,940 | 6/1992 | Willsie | 235/462 |
| 5,155,343 | 10/1992 | Chandler et al. | 235/462 |
| 5,155,344 | 10/1992 | Fardeau et al. | 235/462 |
| 5,173,946 | 12/1992 | Rao | 382/22 |

FOREIGN PATENT DOCUMENTS 0449634 10/1991 European Pat. Off. .
0449645 10/1991 European Pat. Off. .
0450878 10/1991 European Pat. Off. .

*Primary Examiner*—Leo H. Boudreau
*Attorney, Agent, or Firm*—Steve Mendelsohn; William H. Murray

[57] ABSTRACT

A system for finding a corner of an artifact in a two-dimensional pixel image selects an original seed pixel and generates a reference vector using the original seed pixel. The system selects a next seed pixel using the original seed pixel and generates a current vector using the next seed pixel. The system compares the current vector to the reference vector and selects a corner based on that comparison. Also a system for finding a corner of a bar code symbol in a two-dimensional pixel image selects a sequence of seed pixels, having a first seed pixel and a plurality of successive seed pixels, where each successive seed pixel is selected in accordance with the previous seed pixel in the sequence. The system generates a reference vector in accordance with the first seed pixel and generates a plurality of successive vectors, each in accordance with a successive seed pixel. The system compares the reference vector to each of the successive vectors and selects a corner in accordance with the comparison.

12 Claims, 18 Drawing Sheets

FIG. 1  DETECTING BAR CODE SYMBOLS

FIG. 3  IDENTIFYING BAR CODE SYMBOL START/STOP CHARACTER

FIG. 4 LOCATING FOUR CORNERS OF BAR CODE SYMBOLS
112

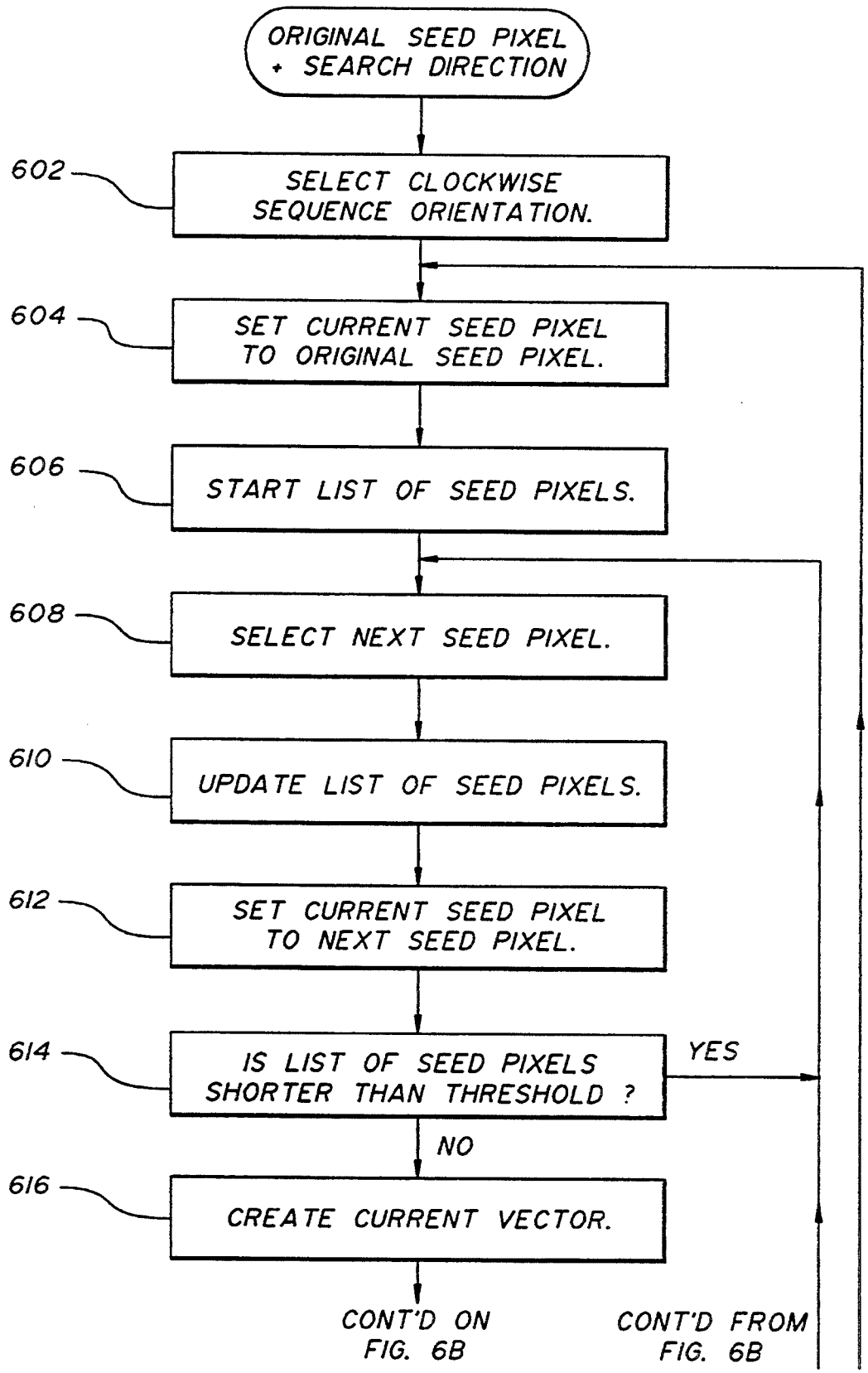
FIG. 6A  LOCATING TWO CORNERS OF A BAR CODE SYMBOL

FIG. 6B LOCATING TWO CORNERS OF A BAR CODE SYMBOL (CONT'D)
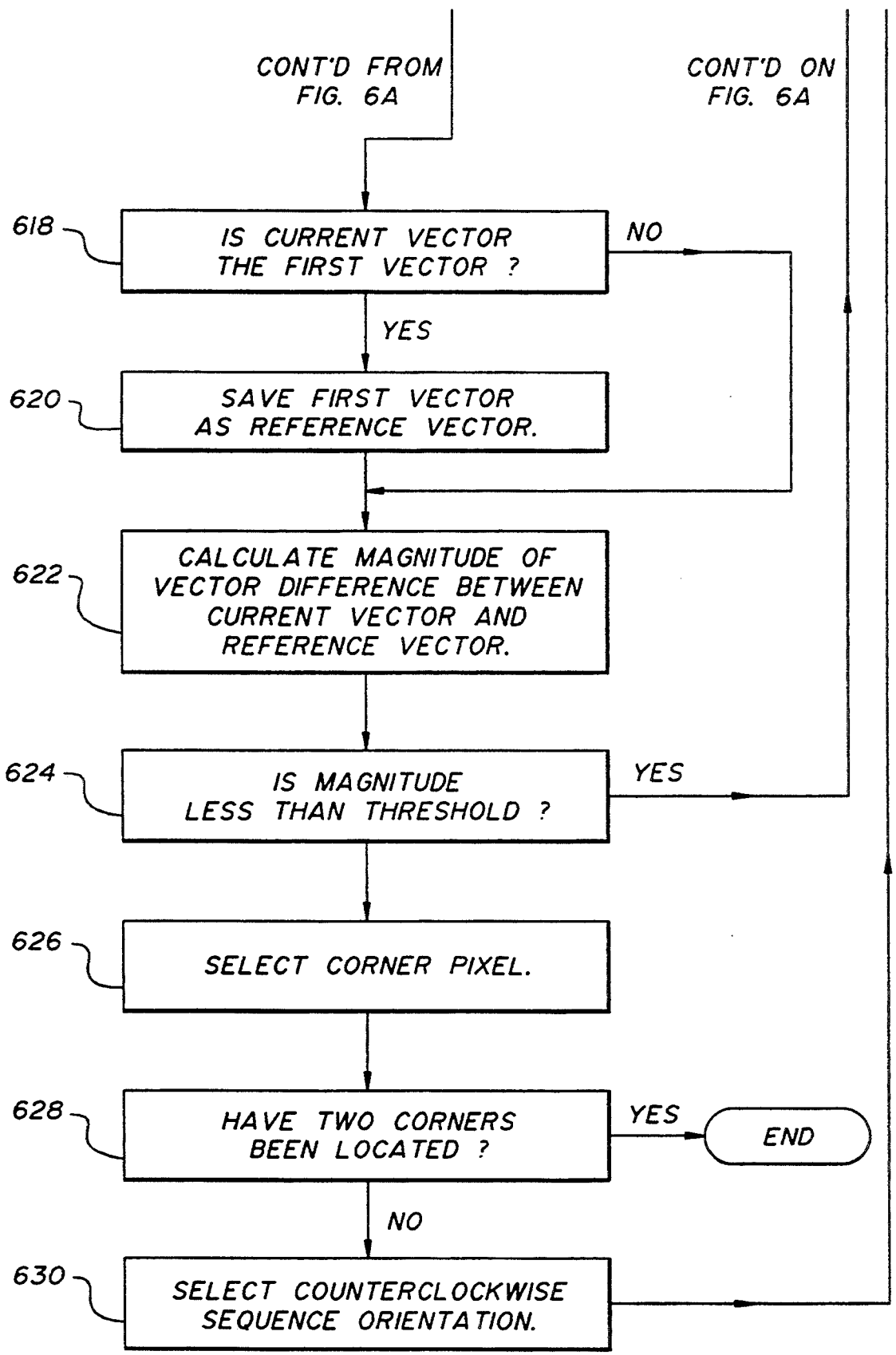

FIG. 7 SELECTING NEXT SEED PIXEL FROM CURRENT SEED PIXEL
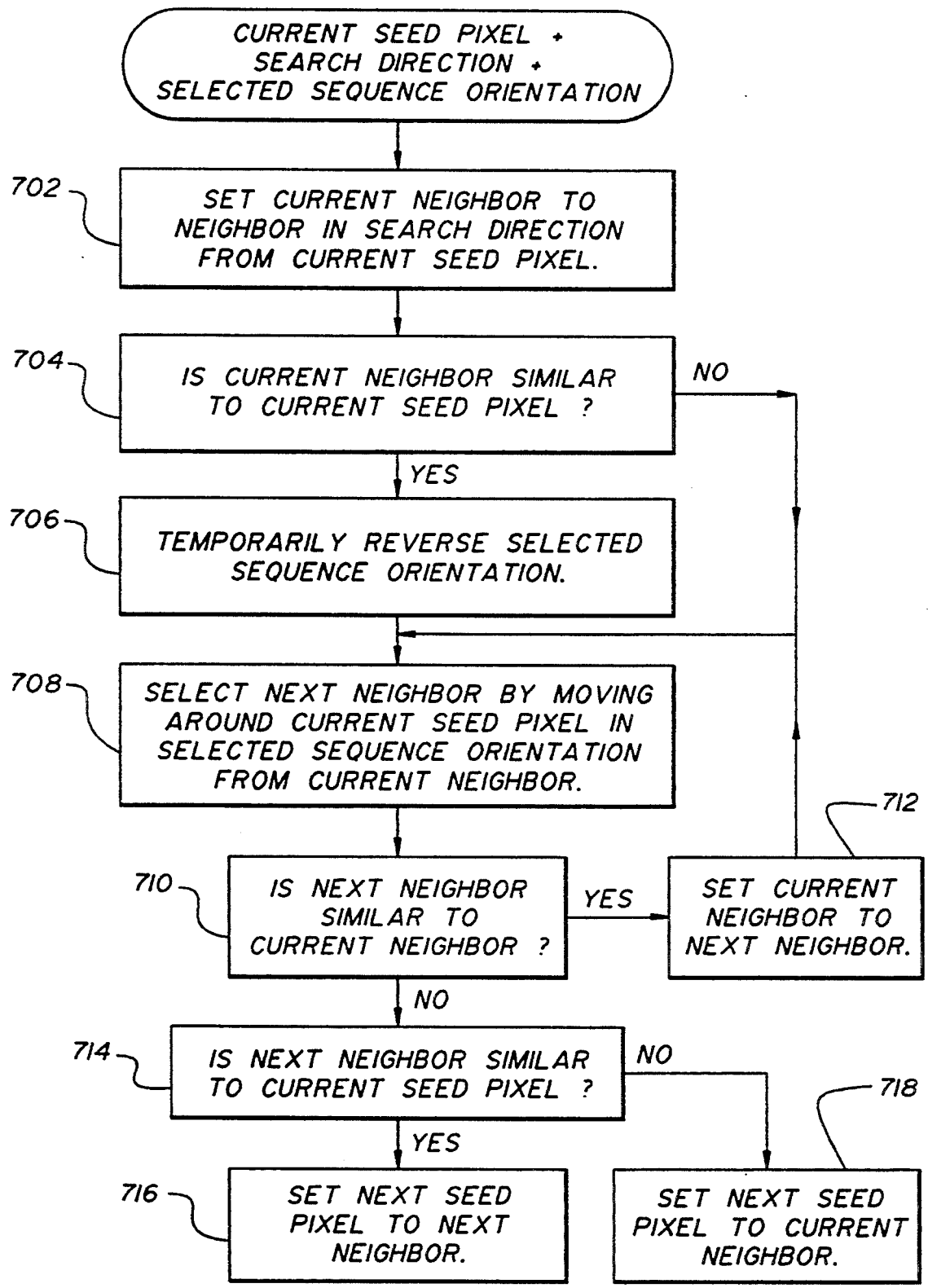

| CYCLE | LIST OF SELECTED SEED PIXELS | | | | | CURRENT VECTOR | MAGNITUDE OF VECTOR DIFFERENCE |
|---|---|---|---|---|---|---|---|
| 1 | (13,6) | | | | | | |
| 2 | (13,6), | (12,7) | | | | | |
| 3 | (13,6), | (12,7), | (12,8) | | | | |
| 4 | (13,6), | (12,7), | (12,8), | (11,9) | | | |
| 5 | (13,6), | (12,7), | (12,8), | (11,9), | (10,10) | (-3,4) | 0 |
| 6 | (12,7), | (12,8), | (11,9), | (10,10), | (9,11) | (-3,4) | 0 |
| 7 | (12,8), | (11,9), | (10,10), | (9,11), | (9,12) | (-3,4) | 0 |
| 8 | (11,9), | (10,10), | (9,11), | (9,12), | (8,13) | (-3,4) | 0 |
| 9 | (10,10), | (9,11), | (9,12), | (8,13), | (7,14) | (-3,4) | 0 |
| 10 | (9,11), | (9,12), | (8,13), | (7,14), | (6,14) | (-3,3) | 1.0 |
| 11 | (9,12), | (8,13), | (7,14), | (6,14), | (5,13) | (-4,1) | 3.2 |
| 12 | (13,6) | | | | | | |

FIG. 8

FIG. 9 DECODING BAR CODE SYMBOLS

FIG. 11  STEPPING ALONG A REFERENCE LINE

FIG. 14 SUBPIXEL INTERPOLATION FOR A BAR
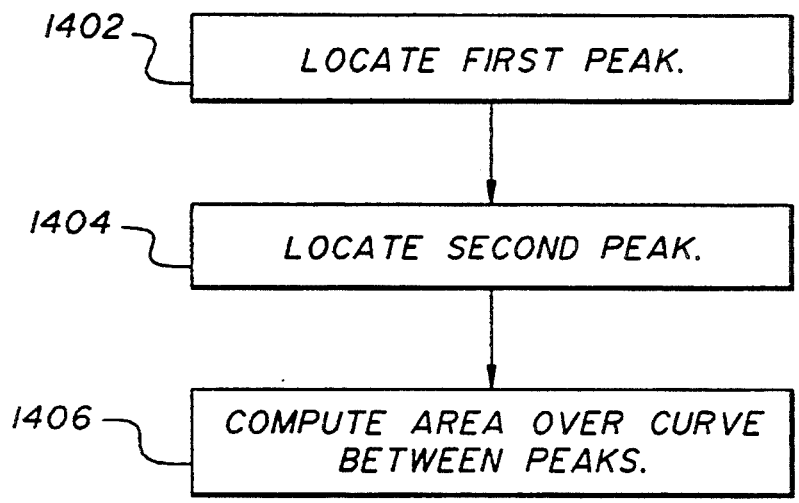
FIG. 15 SUBPIXEL INTERPOLATION FOR A SPACE
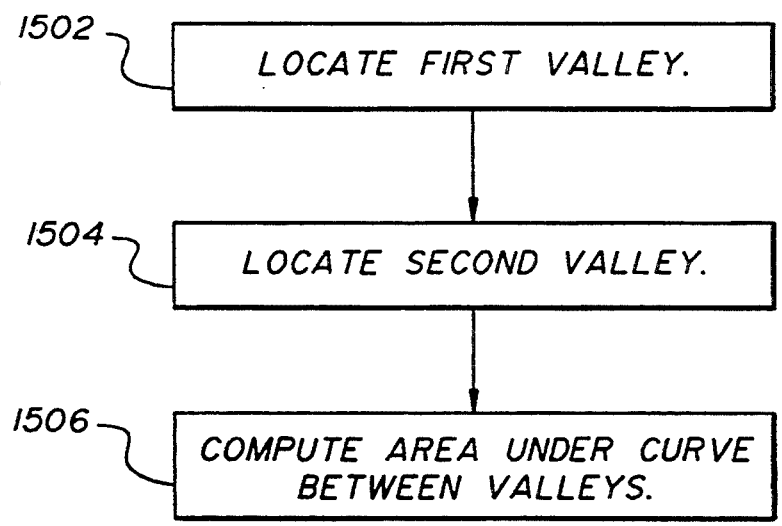

FIG. 17 DECODING BAR CODE SYMBOLS BY STITCHING

METHOD AND APPARATUS FOR DETECTING ARTIFACT CORNERS IN TWO-DIMENSIONAL IMAGES

BACKGROUND OF THE INVENTION

1. Field of the Invention

The present invention relates to detecting artifact corners in two-dimensional images, and, in particular, to methods and apparatuses for detecting corners of bar code symbols that are randomly arranged in two-dimensional gray-scale pixel images.

2. Statement of Related Art

Bar codes are the most widely used code for automatic identification. Traditional bar code symbol readers are laser scanners that are ill-suited for reading two-dimensional codes. In addition, they may require frequent maintenance and tuning. Two-dimensional codes may be more easily read by systems with cameras having linear CCD arrays. Such cameras, which require little maintenance or tuning, generate two-dimensional gray-scale pixel images of code symbols. The present invention detects and decodes bar code symbols in pixel images generated by CCD camera systems, so that the same code symbol reader may be used for reading both bar codes and two-dimensional codes.

SUMMARY OF THE INVENTION

In a preferred embodiment, the present invention is a system for finding a corner of an artifact in a two-dimensional pixel image. The system selects an original seed pixel and generates a reference vector using the original seed pixel. The system selects a next seed pixel using the original seed pixel and generates a current vector using the next seed pixel. The system compares the current vector to the reference vector and selects a corner based on that comparison.

In an alternative preferred embodiment, the present invention is a system for finding a corner of a bar code symbol in a two-dimensional pixel image. The system selects a sequence of seed pixels, having a first seed pixel and a plurality of successive seed pixels, where each successive seed pixel is selected in accordance with the previous seed pixel in the sequence. The system generates a reference vector in accordance with the first seed pixel and generates a plurality of successive vectors, each in accordance with a successive seed pixel. The system compares the reference vector to each of the successive vectors and selects a corner in accordance with the comparison.

BRIEF DESCRIPTION OF THE DRAWINGS

FIGS. 6A and 6B are a process flow diagram of a two-corner location subsystem for locating two corners of a bar code symbol according to a preferred embodiment of the present invention;

FIG. 7 is a process flow diagram for a seed pixel selection subsystem of the two-corner location subsystem of FIG. 6 for selecting a next seed pixel from a current seed pixel;

FIG. 8 is a table representing first twelve processing cycles of the two-corner location subsystem of FIG. 6 for the sub-image of FIG. 5;

FIG. 14 is a process flow diagram of a subpixel interpolation subsystem for calculating signal energy values for bar code symbol bars according to a preferred embodiment of the present invention;

FIG. 15 is a process flow diagram of a subpixel interpolation subsystem for calculating signal energy values for bar code symbol spaces according to a preferred embodiment of the present invention;

DETAILED DESCRIPTION OF THE INVENTION

The present invention includes a system for detecting and decoding bar code symbols. In a preferred embodiment, bar code symbols are contained in two-dimensional gray-scale pixel image signals generated by a charge coupled device (CCD) array camera. Each pixel image may contain one or more randomly placed and oriented bar code symbols. More particularly, the bars in the bar code symbols may not be aligned with either the rows or columns of pixels in the pixel images. The detecting and decoding system of the present invention requires no a priori knowledge of the orientations and positions of bar code symbols in the pixel images. That is, the system is able to detect bar code symbols in pixel images by processing the pixel images themselves, without having any existing knowledge about the orientations and positions of those symbols within those pixel images.

In a preferred embodiment of the present invention, a pixel image is scanned along successive selected scan lines at low resolution for a bar code symbol quiet zone. Each successive scan line is preferably selected in accordance with a binary search sequence so that, with successive scan lines, the pixel image is divided into smaller and smaller sections. When a quiet zone is detected, the pixel image is searched along the selected scan line at high resolution for any one of a set of reference bar code symbol start/stop characters contained in a reference table. If one such start/stop character is found, then a bar code symbol is detected and the four corners of the bar code symbol are located in the pixel image. Using these four corners to identify the region of the pixel image containing the detected bar code symbol, the bar code symbol is then decoded. After decoding a detected bar code symbol, scanning the pixel image for another quiet zone of another bar code symbol is resumed at low resolution. This detecting and decoding of bar code symbols may continue until the low-resolution scanning for quiet zones has subdivided the pixel image into a specified section size.

Detecting and Decoding Bar Code Symbols

Figure 1:
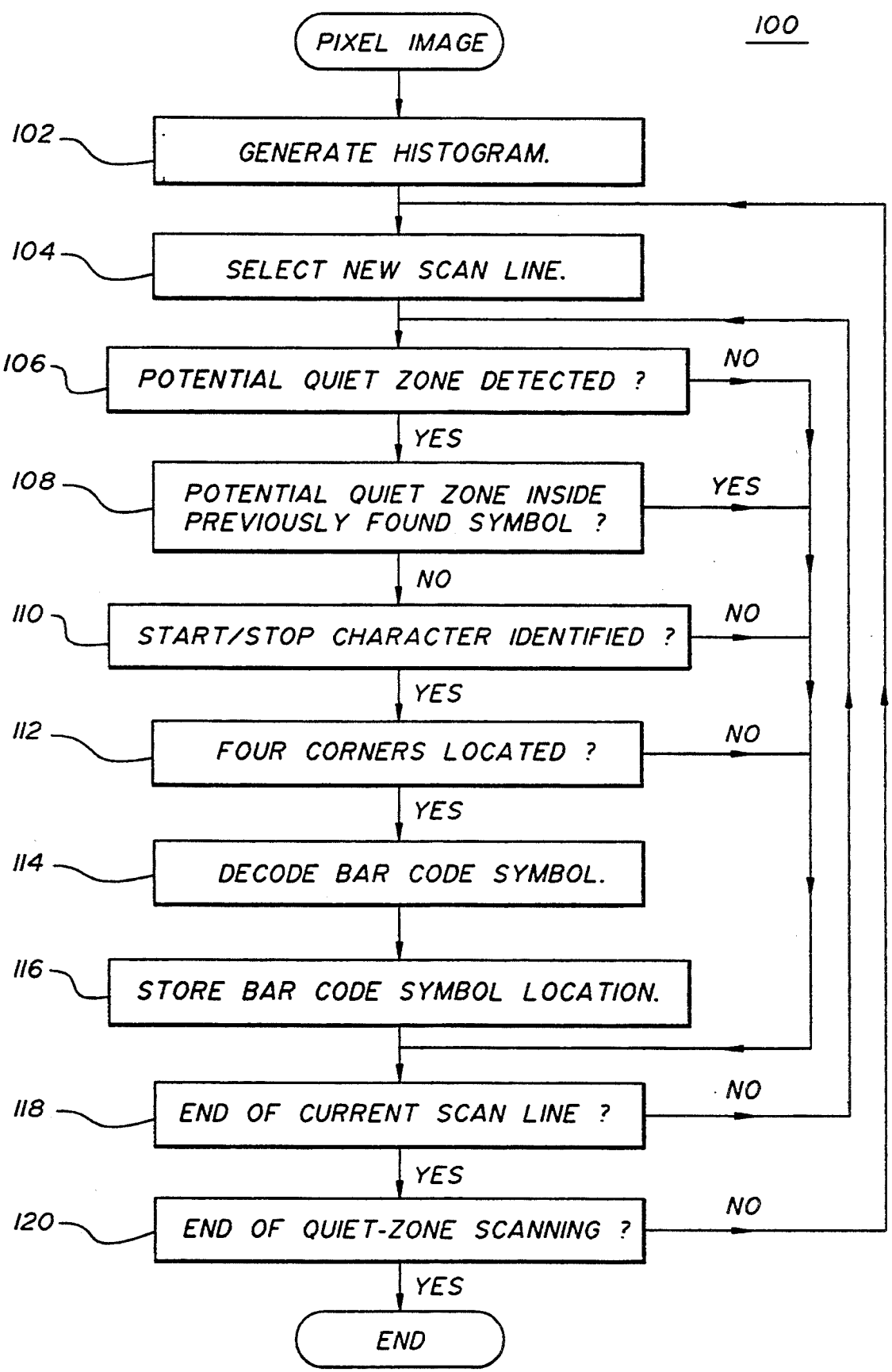
FIG. 1 is a process flow diagram of the detection system for detecting bar code symbols according to a preferred embodiment of the present invention.

Referring now to FIG. 1, there is shown a process flow diagram of detection system 100 for detecting and decoding bar code symbols according to a preferred embodiment of the present invention. Detection system 100 receives a two-dimensional gray-scale pixel image as input, scans the pixel image in one dimension for quiet zones, searches in one dimension for start/stop characters after finding each quiet zone, finds the four corners of each bar code symbol that is detected, and decodes each detected bar code symbol. Detection system 100 may reside in and operate on a 16-MHz 386sx computer with a math co-processor or on a "SUPERCARD2" brand i860 CPU RISC processor, manufactured by CSPI.

In a preferred embodiment of the present invention, detection system 100 accepts a pixel image as input and means 102 generates a histogram of the pixel image. The histogram indicates the minimum and maximum intensity levels for the pixels in that pixel image. As explained later in this specification in conjunction with FIGS. 14 and 15, these minimum and maximum intensity levels are used to determine the widths of the bars and spaces of bar code symbols contained in the pixel image.

Detection system 100 scans through the pixel image for quiet zones along selected scan lines. Each scan line is either a row or column of pixels in the pixel image. In a preferred embodiment of the present invention, the scan lines are selected in a bi-directional binary search sequence.

Figure 2:
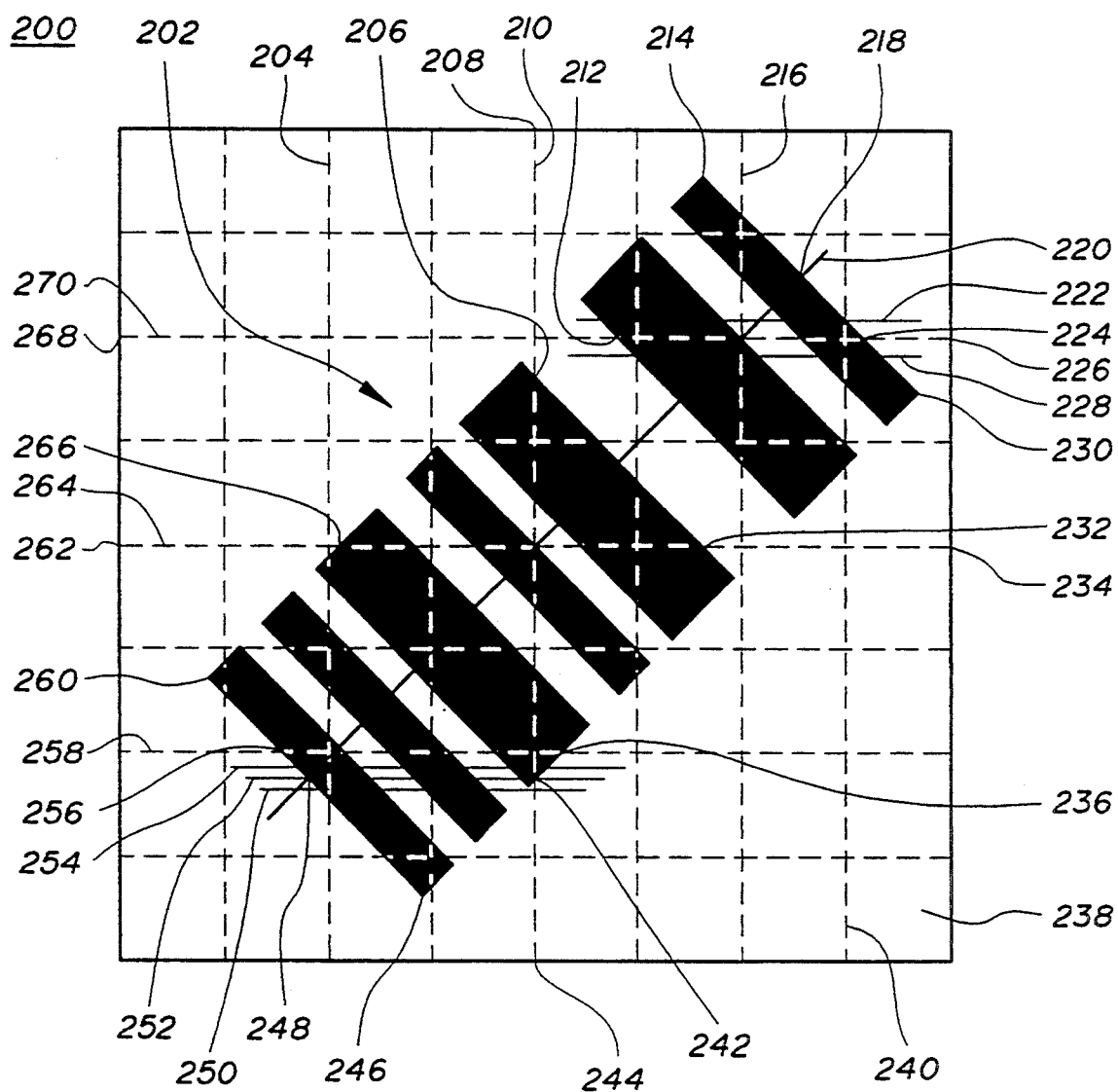
FIG. 2 is a graphical representation of a pixel image containing a bar code symbol oriented at a 45-degree angle with respect to the rows and columns of pixels in the pixel image.

Referring now to FIG. 2, there is shown a graphical representation of pixel image 200 containing bar code symbol 202 oriented at a 45-degree angle with respect to the rows and columns of pixels in pixel image 200. According to a preferred bi-directional binary search sequence of the present invention, a first scan line 264 divides pixel image 200 in half horizontally. A second scan line 210 divides pixel image 200 in half vertically. Third and fourth scan lines 270 and 258 divide the top and bottom halves of pixel image 200 in half again, respectively. Similarly, fifth and sixth scan lines 204 and 216 divide the left and right halves of pixel image 200 in half again, respectively. Thus, scan lines are preferably either parallel or perpendicular to one another.

The selection of subsequent scan lines is preferably made by continually dividing in half the remaining sections of pixel image 200. Depending on the operational requirements imposed on detection system 100, the scanning of pixel image 200 may continue until a specified minimum section size is reached, until each and every pixel row and column is scanned, or until the allowed processing time has expired. In a preferred embodiment, scanning of pixel image 200 ensures that each bar code symbol quiet zone is scanned at least two times.

For example, pixel image 200 may represent an imaged area that is 5.12 inches wide and 5.12 inches high, with each pixel representing an area that is 0.01 inch by 0.01 inch in size. If the bar code symbols being searched for have bars that are at least 2 inches high, then a search sequence preferably selects scan lines until pixel image 200 is divided into sections that are at least as small as 0.71 inch by 0.71 inch. Where pixel image 200 represents an area that is 5.12 inches by 5.12 inches square and is scanned in accordance with the preferred binary search sequence shown in FIG. 2, each section 238 will represent a 0.64-inch by 0.64-inch square area. Such section sizes ensure that the quiet zones of a 2-inch high bar code symbol aligned at a worst-case 45-degree angle relative to the pixel rows and columns will be scanned at least two times.

Referring again to FIG. 1, means 104 is provided for selecting a scan line from the pixel rows and columns in a pixel image. Means 106 scans the selected scan line in a quiet-zone scan direction for a potential bar code symbol quiet zone. Scanning for quiet zones is preferably performed at low resolution, where the intensity level of only every second or third pixel in the selected scan line is analyzed.

In a preferred embodiment, the energy of each pixel in the pixel image corresponds to a gray-scale intensity level. Pixels corresponding to white or bright areas of the pixel image have high energies and high gray-scale intensity levels, while pixels corresponding to black or dark areas have low energies and low gray-scale intensity levels. For example, in an 8-bit gray-scale pixel image, absolute white corresponds to an intensity level of 255 and absolute black corresponds to an intensity level of 0.

A bar code symbol quiet zone is a relatively large bright area adjacent to a bar code symbol. Means 106 detects a quiet zone by looking along the selected scan line for a state transition from a sequence of n bright pixels to at least one dark pixel, or from a dark pixel to a sequence of n bright pixels, where n is a specified value. A pixel is considered bright if its intensity level is greater than a first threshold, otherwise the pixel is considered dark. In a preferred embodiment, means 102 determines the first threshold by generating a histogram of the pixel image. The first threshold may be either the mean intensity level or the median intensity level from the histogram. Alternatively, the first threshold may simply be a predetermined constant or may be determined in other ways, including other types of statistical analysis. In any case, the first threshold is used to distinguish dark pixels from bright pixels in the pixel image.

In order to detect potential quiet zones, means 106 searches for continuous sequences of n bright pixels, where n is an integer that is greater than a second threshold. This second threshold depends on the resolution of the pixel image, the size of the quiet zones being searched for, and the resolution of the quiet-zone scanning. For example, when every third pixel is analyzed in searching for quiet zones that are at least 0.25 inches wide in a pixel image wherein each pixel represents a 0.01-inch by 0.01-inch square area, the second threshold may be selected to be 7 pixels.

In a preferred embodiment, all vertical quiet-zone scans follow the same quiet-zone scan direction, either top to bottom or bottom to top, and, similarly, all horizontal quiet-zone scans follow the same quiet-zone scan direction, either left to right or right to left. In alternative embodiments, scanning for quiet zones may be performed at high resolution by analyzing every pixel in each selected scan line, and scanning of selected scan lines may proceed along different quiet-zone scan directions.

If means 106 determines that a potential quiet zone is not detected along the selected scan line, then means 118 determines whether quiet-zone scanning has reached the end of the selected scan line. If means 118 determines that end of the selected scan line has not been reached, then processing proceeds to means 106 to continue quiet-zone scanning along the selected scan line at low resolution for a potential quiet zone; otherwise means 120 determines whether quiet-zone scanning of the entire pixel image is complete. If quiet-zone scanning is not complete, then processing returns to means 104 to select a next scan line for processing; otherwise processing of the pixel image by detection subsystem 100 is complete.

If means 106 determines that a potential quiet zone is detected along the selected scan line, then means 108 determines whether the potential quiet zone is inside a region of the pixel image previously determined to contain a bar code symbol. In a preferred embodiment, detection system 100 ignores those regions of the pixel image that contain bar code symbols that were already detected and decoded. If the potential quiet zone is inside such a region, then means 118 determines whether quiet-zone scanning has reached the end of the selected scan line.

If means 108 determines that the potential quiet zone is not inside a pixel image region containing a previously detected and decoded symbol, then start/stop character identification subsystem 110 determines whether or not the potential quiet zone is a true quiet zone. A true quiet zone follows or precedes a start/stop character. Identification subsystem 11O searches along the selected scan line at high resolution to identify a start/stop character. Thus, the search direction and the selected scan line are collinear. Identification subsystem 110 is described briefly below and again in further detail later in this specification in conjunction with FIG. 3.

Subsystem 110 is provided for searching at high resolution along the selected scan line for a bar code symbol start/stop character. In a preferred embodiment, searching at high resolution involves analyzing the intensity of every pixel along a portion of the selected scan line. If means 106 detected a potential quiet zone in which the state transition was from bright to dark, then a bar code symbol may follow the potential quiet zone in the quiet-zone scan direction. In that case, subsystem 110 searches for a start/stop character in the same direction as the quiet-zone scan. Alternatively, if the potential quiet zone detected by means 106 has a state transition from dark to bright, then a bar code symbol may precede the potential quiet zone. In that case, subsystem 110 searches along the selected scan line in the direction opposite the quiet-zone scan direction for a start/stop character.

Start/stop character identification subsystem 110 determines whether a stop/start character abuts the potential quiet zone detected by means 106. In a preferred embodiment, detection system 100 may be used to detect symbols of any recognized bar code symbology. These may include, for example, symbols of the Universal Product Code (UPC), the European Article Numbering system (EAN), Interleaved 2 of 5, Codabar, Code 39, Code 128, Code 93, Code 49, or Code 16K symbologies. Detection system 100 may include a reference table containing information regarding start/stop characters of any bar code symbology. For purposes of this invention, start/stop characters may be considered to include termination bars or patterns which traditionally abut such characters. If subsystem 110 does not identify a character adjacent to the potential quiet zone as one of these reference start/stop characters, then the potential quiet zone is rejected as a false quiet zone and means 118 determines whether the end of the selected scan line has been reached, as described earlier. If subsystem 110 does identify a character adjacent to the potential quiet zone as a reference start/stop character, then a bar code symbol is determined to exist in the pixel image and processing continues with four-corner location subsystem 112.

Four-corner location subsystem 112 attempts to locate the four corners of the bar code symbol identified by identification subsystem 110. If location subsystem 112 does not locate all four corners of the detected bar code symbol, then the detected bar code symbol is rejected and processing continues to means 118. Otherwise, after location subsystem 112 successfully locates the four corners of the bar code symbol, decoding subsystem 114 decodes the detected bar code symbol. Location subsystem 112 and decoding subsystem 114 are described in further detail later in this specification in conjunction with FIGS. 4 and 9, respectively.

After decoding subsystem 114 decodes the detected bar code symbol, means 116 retains information about the region of the pixel image containing that bar code symbol. Means 108 uses the information stored by mean 116 to ignore that same region during subsequent processing. After detecting and decoding a bar code symbol, detection system 100 continues to scan unscanned regions of the pixel image for other bar code symbols. Thus, after means 116 stores information about the region of the pixel image containing the decoded bar code symbol, processing continues with means 118, which determines whether the end of the selected scan line has been reached.

Referring again to the example of FIG. 2, means 102 of detection system 100 of FIG. 1 generates a histogram of pixel image 200. Means 104 may then select scan line 264 as the first scan line for pixel image 200. Means 106 may perform a low-resolution quiet-zone scan from left to right (the quiet-zone scan direction) along scan line 264 starting from point 262. At point 266, means 106 may detect a state transition from a sequence of bright pixels to at least one dark pixel indicating a potential quiet zone. Means 108 then determines that the potential quiet zone is not inside a pixel image region containing a bar code symbol previously detected and decoded. Start/stop character identification subsystem 110 searches along scan line 264 in the quiet-zone scan direction at high resolution for a reference start/stop character contained in the reference table. Since point 266 is not the start of a start/stop character, subsystem 110 does not identify any reference start/stop character, indicating that the potential quiet zone detected by means 106 was a false quiet zone. Means 118 then determines that the end of scan line 264 has not been reached and means 106 resumes the low-resolution scan in the quiet-zone scan direction (left to right) along scan line 264 from point 266.

Means 106 may detect another state transition from a dark pixel to sequence of bright pixels at point 232 indicating another potential quiet zone. Means 108 again determines that this potential quiet zone is not inside a region of pixel image 200 containing a previously decoded bar code symbol. Since the detected state transition is from dark to bright, subsystem 110 searches for a start/stop character at high resolution along scan line 264 from right to left, that is, in the direction opposite that of the quiet-zone scan direction. Once again, subsystem 110 fails to identify a reference start/stop character, means 118 determines that scan line 264 is not complete, and means 106 resumes the low-resolution quiet-zone scan along scan line 264 from point 232 in the quiet-zone scan direction from left to right.

The low-resolution quiet-zone scan along scan line 264 continues in the quiet-zone scan direction without detecting any more potential quiet zones until point 234 is reached, at which time means 118 determines that scan line 264 is complete. Means 120 then determines that scan line 264 is not the last scan line for pixel image 200 and that quiet-zone scanning of pixel image 200 is therefore not complete. Means 104 then selects scan line 210 as the next scan line for low-resolution quiet-zone scanning from point 208 to point 244. Thus, during low-resolution scanning from point 208 to point 244, the quiet-zone scan direction is from top to bottom. While scanning pixel image 200 at low resolution for quiet zones along scan line 210, means 106 may detect potential quiet zones corresponding to the state transitions at points 206 and 242 that are rejected by identification subsystem 110 as false quiet zones.

After completing the low-resolution quiet-zone scan of pixel image 200 along scan line 210, means 104 selects scan line 270 and begins scanning from point 268 to point 226 in a left-to-right quiet-zone scan direction. After detecting another false quiet zone at point 212, means 106 detects a state transition from a dark to a sequence of bright pixels at point 224 and again means 108 determines that the region is not to be ignored. Subsystem 110 then performs a high-resolution search for a start/stop character from right to left (i.e., in a direction opposite the quiet-zone scan direction) along scan line 270. In this case, identification subsystem 110 may identify a reference start/stop character at point 224. Location subsystem 112 then locates corners 214, 230, 246, and 260, and decoding subsystem 114 decodes bar code symbol 202.

After decoding bar code symbol 202, detection system 100 continues to scan pixel image 200 for other bar code symbols along other selected scan lines. In a preferred embodiment, means 108 instructs detection system 100 to ignore the region of pixel image 200 containing detected and decoded bar code symbol 202 while performing subsequent low-resolution quiet-zone scanning. Thus, detection system 100 subsequently ignores potential quiet zones associated with bar code symbol 202. For example, after completing scan line 270, detection system 100 may scan at low resolution along scan line 258. In doing so, detection system 100 ignores both the potential quiet zone at point 256 and the potential quiet zone at point 236.

Detection system 100 continues to scan pixel image 200 for other bar code symbols until means 120 determines that the last selected scan line has been completely scanned. In the example shown, detection system 100 continues to select scan lines until each of the 14 grid lines 240 of FIG. 2 has been selected.

Identifying Bar Code Symbol Start/Stop Characters

Figure 3:
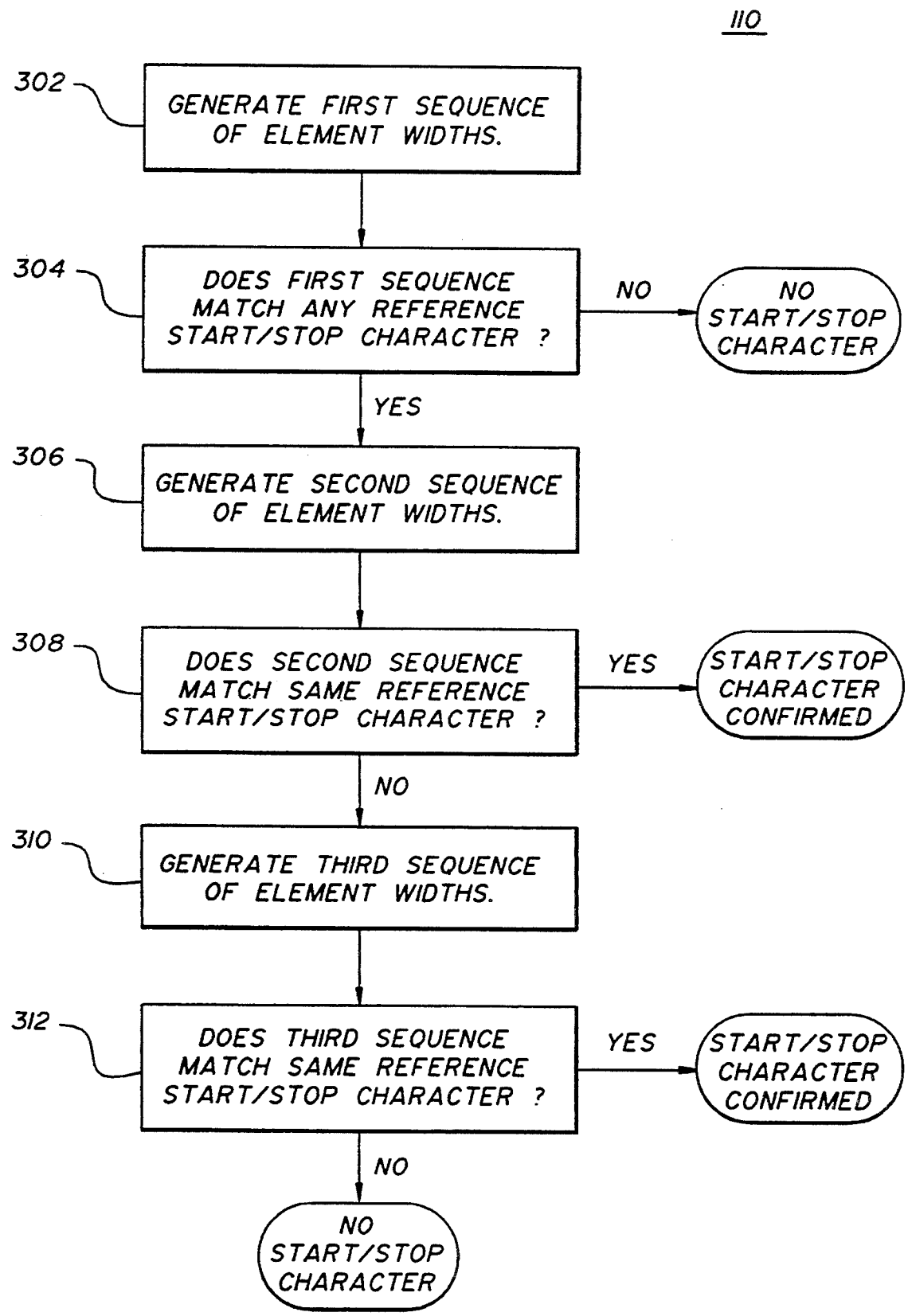
FIG. 3 is a process flow diagram of a start/stop character identification subsystem of the detection system of FIG. 1 for identifying bar code symbol start/stop characters.

Referring now to FIG. 3, there is shown a process flow diagram of start/stop character identification subsystem 110 of detection system 100 for identifying bar code symbol start/stop characters according to a preferred embodiment of the present invention. Identification subsystem 110 searches at high resolution for a start/stop character along the selected scan line in the direction dictated by the type of state transition detected by means 106 of detection system 100. If a reference start/stop character is identified, then identification subsystem 110 verifies that identification by searching for the same start/stop character along search lines parallel to the selected scan line.

Means 302 is provided for generating a first sequence of symbol element widths for detecting a bar code symbol start/stop character along the selected scan line. Each element in the sequence has an element width and is either a bar or a space. Means 302 derives the element widths of the sequence from signal energy values generated during subpixel interpolation along a portion of the selected scan line. Subpixel interpolation is described in further detail later in this specification in conjunction with FIGS. 14 and 15.

Searching for a start/stop character preferably starts at the state transition point used to detect the potential quiet zone. Each reference start/stop character in a reference table has a unique sequence of element widths, and different bar code symbologies may have start/stop characters of different numbers of symbol elements. Means 302 preferably generates a first sequence of n element widths, where n corresponds to the number of symbol elements in the reference start/stop character in the reference table with the largest number of symbol elements.

For example, if detection system 100 is used to detect and decode only Code 128 bar code symbols, then means 302 preferably generates a first sequence of 5 element widths. In Code 128, a start character has 6 elements (3 bars and 3 spaces) and a stop character which includes the termination bar has 7 elements (4 bars and 3 spaces). However, the start and stop characters in Code 128 can be uniquely identified by characterizing the widths of only the first 5 elements. For the Code 128 start character, the 5 elements characterized are the three bars and the two spaces bounded by those three bars. For the Code 128 stop character, the 5 elements characterized are the termination bar, the two bars closest to the termination bar, and the two spaces bounded by those two bars and the termination bar. Since a potential start/stop character may be either a start or a stop character of Code 128, means 302 generates a first sequence of 5 element widths.

The portion of the selected scan line along which means 302 performs subpixel interpolation to generate the first sequence of element widths starts at the state transition point and continues until a sequence of n element widths is generated. If the end of the selected scan line is reached before all n element widths are determined, then the current state transition point does not correspond to a reference start/stop character. In addition, if a "bar" or "space" is too wide to correspond to an element of the expected bar code symbols, then generation of the sequence of element widths may be stopped and no start/stop character is identified.

Means 304 compares the first sequence of element widths with the reference start/stop characters. If means 304 determines that the first sequence does not match any of the reference start/stop characters, then no bar code symbol start/stop character is identified and processing is directed to means 118 of detection system 100 of FIG. 1. Matching between sequences of element widths and reference start/stop characters is preferably based on confidence factors as described in further detail later in this specification in conjunction with FIG. 16.

If, however, means 304 determines that the first sequence does match a reference start/stop character, then means 306 generates a second sequence of element widths by performing subpixel interpolation along a first verification search line parallel to and near the selected scan line. In a preferred embodiment, the first verification search line is displaced from the selected scan line by a few pixels. Means 308 determines if the second sequence of element widths matches the same reference start/stop character identified by means 304. If the second sequence does match the same reference start/stop character, then the start/stop character identified by means 304 is confirmed and processing continues to location subsystem 112 of detection system 100 of FIG. 1 with a confirmed bar code symbol identification.

If means 308 does not confirm the reference start/stop character identification made by means 304, then a second confirmation is attempted by means 310 and means 312. Means 310 and means 312 function substantially in accordance with means 306 and means 308, respectively, except that a second verification search line is analyzed. The second verification search line is positioned on the side of the selected scan line opposite the first verification search line. If means 312 confirms the start/stop character identified by means 304, then processing continues to location subsystem 112 of detection system 100 of FIG. 1 with a confirmed bar code symbol identification. Otherwise, identification subsystem 110 identifies no bar code symbol stop/start character and processing is directed to means 118 of detection system 100 of FIG. 1.

Referring again to the example of FIG. 2, after detection system 100 detects a potential quiet zone at point 224 along scan line 270, means 302 of identification subsystem 110 performs subpixel interpolation along scan line 270 to generate a first sequence of element widths. If means 304 determines that the first sequence matches a reference start/stop character, means 306 then performs subpixel interpolation along first verification search line 222 to generate a second sequence of element widths. If means 308 determines that the second sequence confirms the start/stop character identified by means 304, means 308 then directs processing to location subsystem 112 of detection system 100 of FIG. 1 with a confirmed start/stop character.

If the second sequence does not match the same reference start/stop character identified by means 304, then means 310 performs subpixel interpolation along second verification search line 228 to extract a third sequence of element widths. Means 312 then determines whether the third sequence confirms the start/stop character identified by means 304. A start/stop character may be identified by means 304 and not confirmed by either means 308 or means 312 for various reasons. The identification by means 304 may be a false positive, identifying a bar code symbol where there is none. Alternatively, a bar code symbol may be present, but it may be degraded in the pixel image. Such degradation may be caused by physical defects in the label carrying the bar code symbol or by defects introduced during the creation of the pixel image of that label.

Locating the Four Corners of a Bar Code Symbol

Figure 4:
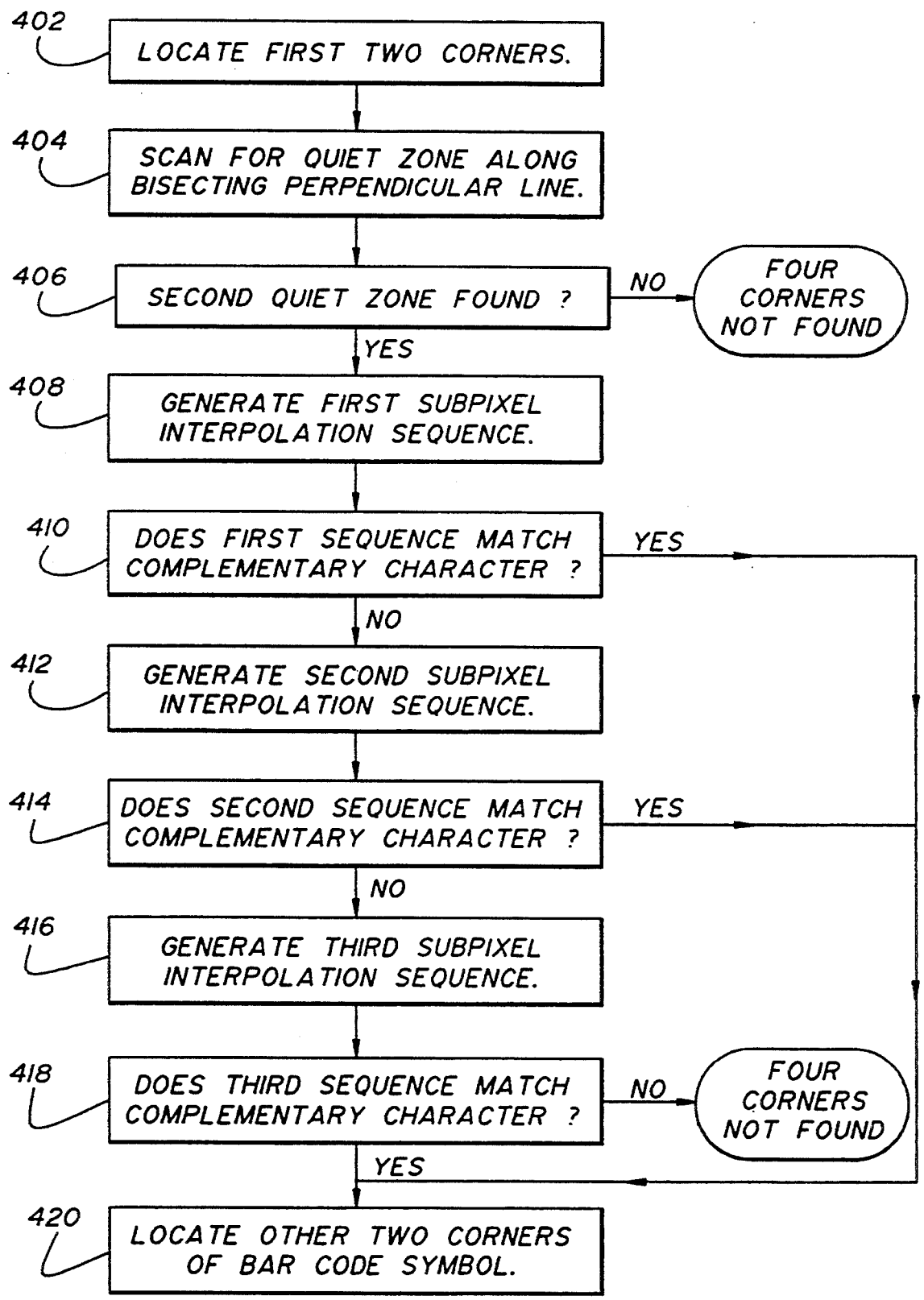
FIG. 4 is a process flow diagram of a four-corner location subsystem of the detection system of FIG. 1 for locating the four corners of a bar code symbol.

Referring now to FIG. 4, there is shown a process flow diagram of four-corner location subsystem 112 of detection system 100 for locating the four corners of a bar code symbol according to a preferred embodiment of the present invention. Location subsystem 112 begins by locating two corners of the start/stop character identified by subsystem 110. These two corners correspond to two corners of the first or outside bar of that first start/stop character. Location subsystem 112 then attempts to find the other end of the bar code symbol by searching for the second quiet zone and the second start/stop character associated with the bar code symbol. If the second quiet zone and second start/stop character are successfully found, location subsystem 112 locates the last two corners of the bar code symbol. These two corners correspond to two corners of the outside bar of the second start/stop character. Each corner is defined by the position of the pixel in the pixel image that contains that corner of the bar code symbol.

Means 402 locates the first two corners of the identified bar code symbol, that is, those at the top and bottom of the outside bar of the start/start character identified by identification subsystem 110. Means 402 is described in further detail later in this specification in conjunction with FIG. 6. After the first two corners are found, means 404 determines the location of a line that bisects and is perpendicular to the line that connects the first two corners. Means 404 performs a low-resolution quiet-zone scan across the detected bar code symbol along the perpendicular bisecting line for the second quiet zone at the other end of the symbol.

Means 406 determines whether that second quiet zone is found by looking for a continuous sequence of n bright pixels along the perpendicular bisecting line, where n is greater than the second threshold. The second threshold was described earlier in this specification in conjunction with FIG. 1. If the second quiet zone is not found, then the four corners are not located and means 406 directs processing to means 118 of detection system 100 of FIG. 1. If means 406 finds the second quiet zone, then means 408 performs subpixel interpolation along a first search line to generate a first sequence of element widths. This first search line may be a pixel row or column that intersects the perpendicular bisecting line at the edge of the second quiet zone.

Means 410 determines whether the first sequence of element widths generated means 408 matches the start/stop character that complements the start/stop character identified by identification subsystem 110. Bar code symbols contain unique start/stop characters that indicate the type of bar code symbology. Every bar code symbol has a pair of complementary start and stop characters, each of which identifies the symbology of the bar code symbol. Therefore, once a first start/stop character is identified at one end of a bar code symbol, the second start/stop character at the other end of the bar code symbol must complement the first start/stop character before a bar code symbol identification can be confirmed. For example, in Code 128, there are three different start characters and one stop character. If one of the three Code 128 start characters is identified, then the complementary stop character is known. Similarly, if the Code 128 stop character is identified, the complementary start character must be one of the three possible Code 128 start characters.

If means 410 determines that the first sequence of element widths generated by means 408 matches the complementary start/stop character, then the second start/stop character is confirmed and means 420 finds the last two corners of the detected bar code symbol, that is, those that define the top and bottom of the outside bar of the second start/stop character. Means 420 functions substantially in accordance with means 402 and is described in further detail later in this specification in conjunction with FIG. 6. Following means 420, processing continues with decoding subsystem 114 of detection system 100.

If the first sequence of element widths generated by means 408 does not match the complementary start/stop character, means 412 performs subpixel interpolation along a second search line to generate a second sequence of element widths. The second search line may be parallel to and near the first search line. In a preferred embodiment, the second search line is parallel to and displaced from the first search line by a few pixels. Means 414 then determines whether the second sequence matches the complementary start/stop character. If so, then processing continues to means 420 for location of the other two corners of the bar code symbol. Otherwise, means 416 generates a third sequence of element widths by performing subpixel interpolation along a third search line positioned on the side of the first search line opposite the second search line. Means 418 then determines whether the third sequence matches the complementary start/stop character. If so, processing continues to means 420 for location of the other two corners of the bar code symbol. Otherwise, the complementary start/stop character is not identified, the four corners of the bar code symbol are not located, and processing returns to means 118 of detection system 100.

Referring again to the example of FIG. 2, after detection system 100 identifies and confirms a first start/stop character of bar code symbol 202 at point 224 along scan line 270, means 402 of four-corner location subsystem 112 locates corners 214 and 230. Means 404 determines the location of line 220 which bisects and is perpendicular to the line between corners 214 and 230 at point 218. Means 404 then scans at low-resolution across bar code symbol 202 along line 220 for the second quiet zone at the other end of bar code symbol 202. Means 406 locates the second quiet zone following point 248 by detecting a continuous sequence of bright pixels longer than the second threshold at that position. Means 408 then performs subpixel interpolation along search line 252 from left to right to generate a first sequence of element widths. Means 410 may then determine that the first sequence matches the complement of the first start/stop character. In that case, means 420 finds corners 246 and 260. If means 410 determines that the first sequence does not match the complementary start/stop character, then location subsystem 112 would attempt to identify the complementary start/stop character using means 412 and 414 along search line 254, and, if necessary, using means 416 and 418 along search line 250.

Locating Two Corners of a Bar Code Symbol

Figure 5:
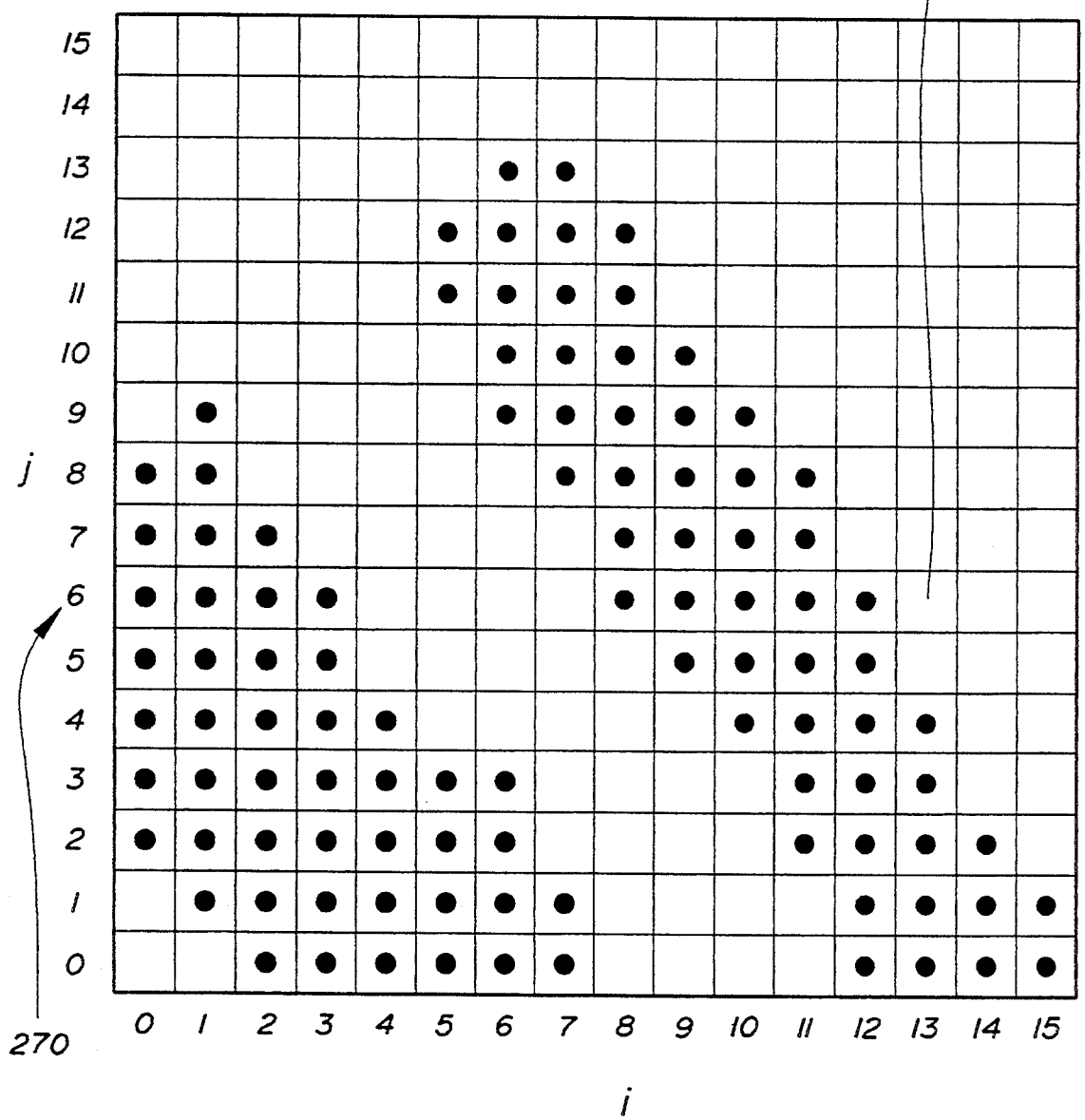
FIG. 5 is a graphical representation of a pixel subimage of the pixel image of FIG. 2.

Referring now to FIG. 5, there is shown a graphical representation of sub-image 500 of pixel image 200 of FIG. 2. Each square in FIG. 5 represents a pixel (i,j) in pixel image 500 identified by column index i and row index j, where i and j run from 0 to 15. Pixel row 6 in FIG. 5 corresponds to scan line 270 of FIG. 2, and pixel (13,6) corresponds to point 224 of FIG. 2. Pixels not lying on the outside edges of pixel image 200 have eight neighbors. For example, the neighbors of pixel (13,6) are pixels (13,5), (14,5), (14,6), (14,7), (13,7), (12,7), (12,6), and (12,5).

Pixels in FIG. 5 have a black dot if their gray-scale intensity level is less than or equal to the first threshold. Similarly, pixels in FIG. 5 have no black dots if their intensity level is greater than the first threshold. As described earlier in this specification in conjunction with FIG. 1, the first threshold may be determined from the histogram of the pixel image generated by means 102 of detection system 100. Pixels shown with a black dot may form part of a bar in bar code symbol 202. Pixels shown without a black dot may form part of spaces in bar code symbol 202.

Referring now to FIG. 6, there is shown a process flow diagram of two-corner location subsystem 600 for locating two corners of a bar code symbol according to a preferred embodiment of the present invention. Means 402 and means 420 of four-corner location subsystem 112 of FIG. 4 function substantially in accordance with two-corner location subsystem 600. Location subsystem 600 finds two corners of a detected bar code symbol by sliding along the "outside edge" of a bar that forms an outside symbol element of a start/stop character to find the outside corners of that bar. The "outside edge" of a bar that forms an outside symbol element of a given start/stop character is positioned where the start/stop character and its associated quiet zone meet.

In order to facilitate explanation, location subsystem 600 is described in the context of the example of FIGS. 2 and 5. After detection system 100 identifies a start/stop character of bar code symbol 202 in pixel image 200, location subsystem 112 activates means 402 to locate corners 214 and 230. After finding the complementary start/stop character, location subsystem 112 activates means 420, which then locates corners 246 and 260.

Location subsystem 600 receives as an input the "original seed pixel." An original seed pixel is a pixel in a quiet zone that abuts a start/stop character. An original seed pixel may be determined by identification subsystem 110 or location subsystem 112. An original seed pixel preferably is a bright pixel that forms part of a quiet zone and is immediately adjacent to a dark pixel that forms part of the first or outside bar of one of the two start/stop characters of a detected bar code symbol. In the example of FIG. 2, the original seed pixel corresponds in location to point 224 and is represented by pixel (13,6) in FIG. 5.

Location subsystem 600 also receives as input the search direction in which detection system 100 searched for the start/stop character associated with the original seed pixel. In a preferred embodiment, there are four possible search directions: east, west, north, and south, corresponding to searching along pixel rows and columns. These four directions, along with the four intermediate directions northeast, southeast, southwest, and northwest, are defined in FIG. 5. Each of the eight neighbors of the current seed pixel has a unique direction relative to the current seed pixel. In the example of FIG. 5, the search direction received by location subsystem 600 is west, since the high-resolution search for the stop/start character adjacent to point 224 along line 270 proceeded from east to west.

Location subsystem 600 finds a corner by sliding along the outside edge of the first bar of a start/stop character in search of the corner. Location subsystem 600 slides along the outside edge of the bar by replacing the current seed pixel with a next seed pixel after analyzing the neighbors of the current seed pixel in either a clockwise or counterclockwise sequence orientation. A selected sequence orientation of clockwise results in location of one of the two corners of the first bar of the start/stop character, while a selected sequence orientation of counterclockwise results in location of the other corner. Since location subsystem 600 eventually locates both corners, location subsystem 600 uses both the clockwise sequence orientation to locate one corner and the counterclockwise sequence orientation to locate the other corner. It does not matter which sequence orientation is selected first. The selection of a next seed pixel based on a current seed pixel using a clockwise or counterclockwise sequence orientation is described in further detail later in this specification in conjunction with FIG. 7.

After the original seed pixel and the search direction are received by location subsystem 600 as inputs, means 602 selects a clockwise sequence orientation to be used in the selection of a next seed pixel from a current seed pixel. Means 604 then sets the current seed pixel equal to the original seed pixel and means 606 starts the list of selected seed pixels. Location subsystem 600 maintains a list of the last n pixels selected as seed pixels, where n is preferably 5. Means 606 starts growing the list of selected seed pixels with the original seed pixel.

Seed pixel selection subsystem 608 selects the next seed pixel from the current seed pixel based on the selected sequence orientation (i.e., clockwise or counterclockwise) and the search direction. Seed pixel selection subsystem 608 is described in further detail later in this specification in conjunction with FIG. 7. Means 610 then updates the list of selected seed pixels by adding the current seed pixel to the end of the list and means 612 sets the current seed pixel to be the next seed pixel. After the list of selected seed pixels reaches the preferred length of 5 pixels, means 610 updates the list by adding the current seed pixel to the end of the list and deleting the first seed pixel in the list.

If means 614 determines that the length of the list of selected seed pixels is less than the preferred threshold of 5, then processing returns to seed pixel selection subsystem 608 to select the next seed pixel. Otherwise, means 616 creates a current vector. The current vector is determined by translating to the origin the vector from the first seed pixel in the list of selected seed pixels to the last seed pixel in the list, where the origin may be any pixel in the pixel image. If means 618 determines that the current vector is the first vector generated by location subsystem 600 for the selected sequence orientation, then means 620 saves the current vector as a reference vector before proceeding to means 622; otherwise, processing proceeds directly to means 622.

Means 622 calculates the magnitude of the vector difference between the current vector and the reference vector. If means 624 determines that that magnitude is less than a specified third threshold, a corner has not yet been detected and processing returns to seed pixel selection subsystem 608. Otherwise, a corner has been detected and means 626 selects a pixel corresponding to that detected corner. If means 628 then determines that the detected corner is only the first of the two corners to be located, then means 630 selects a counterclockwise sequence orientation and processing returns to means 604 to start the search for the second corner. To search for the second corner with a counterclockwise sequence orientation, means 604 returns to the original seed pixel as the current seed pixel and means 606 starts the list of selected seed pixels over again with only the original seed pixel. Otherwise, if means 628 determines that the just-detected corner is the second corner, then both corners have been located and location subsystem 600 is complete.

Those skilled in the art will understand that location subsystem 600 may detect corners of bar code symbols using measures other than the magnitude of the vector difference. For example, in an alternative preferred embodiment, means 622 calculates the magnitude of the angle between the current vector and the reference vector. This may be referred to as the phase of the vector difference. Means 624 then tests this phase against a selected phase threshold. If the phase is less than the phase threshold, then a corner has not yet been detected; otherwise, a corner has been detected.

Selecting a Next Seed Pixel from a Current Seed Pixel

Referring now to FIG. 7, there is shown a process flow diagram for seed pixel selection subsystem 608 for selecting a next seed pixel from a current seed pixel according to a preferred embodiment of the present invention. Selection subsystem 608 forms part of two-corner location subsystem 600. Selection subsystem 608 selects the next seed pixel from the eight neighboring pixels of the current seed pixel. Like the current seed pixel, the next seed pixel forms part of the quiet zone. In addition to being a neighbor of the current seed pixel, the next seed pixel lies immediately adjacent to another neighbor of the current seed pixel, which other neighbor forms part of the outside bar of the start/stop character.

If the intensity levels of two pixels are both less than or equal to the first threshold, they are considered "similar," because they may both form parts of one or more bars. Two pixels are also considered similar if their intensity levels are both greater than the first threshold, because they may both form parts of one or more spaces. For example, in FIG. 5, pixels (12,6) and (11,6) are similar to each other, as are pixels (12,7) and (13,6), but not pixels (12,6) and (13,6).

Selection subsystem 608 receives as input the current seed pixel, search direction, and the selected sequence orientation. The selected sequence orientation may be either clockwise or counterclockwise. Selection subsystem 608 analyzes neighbors of the current seed pixel in either clockwise or counterclockwise sequence orientation to determine the next seed pixel. After the input is received, means 702 of selection subsystem 608 sets the current neighbor to be the neighbor in the search direction from the current seed pixel. For example, if the search direction is west, means 702 selects the west neighbor of the current seed pixel as the current neighbor.

Means 704 determines whether the current neighbor is similar to the current seed pixel, that is, whether they are both bright pixels that may form part of a quiet zone. If so, then, before proceeding to means 708, means 706 temporarily reverses the selected sequence orientation for neighbor analysis, that is, from clockwise to counterclockwise or from counterclockwise to clockwise, whichever orientation is appropriate. This reversal of the selected sequence orientation is temporary in that the reverse sequence orientation is retained only until processing of selection subsystem 608 is complete. When processing returns to location subsystem 600, the sequence orientation reverts back to what it was when selection subsystem 608 was implemented. Otherwise, if the current neighbor is not similar to the current seed pixel, processing proceeds directly to means 708.

Means 708 selects the next neighbor by moving around the current seed pixel in the selected sequence orientation from the current neighbor in 45-degree increments. For example, if the current neighbor is the west neighbor and the selected sequence orientation is clockwise, then means 708 selects the northwest neighbor to be the next neighbor. Similarly, if the current neighbor is west neighbor and the selected sequence orientation is counterclockwise, then the southwest neighbor is selected as the next neighbor.

If means 708 determines that the next neighbor is similar to the current neighbor, then the next seed pixel has not yet been found. In that case, means 712 sets the current neighbor to be the next neighbor and processing returns to means 708 to select the next neighbor. Otherwise, means 714 determines whether the next neighbor is similar to the current seed pixel. If so, then means 716 selects the next seed pixel to be the next neighbor. Otherwise, means 718 selects the next seed pixel to be the current neighbor. In either case, the next seed pixel is selected and processing of selection subsystem 608 is complete.

Example of Locating a Corner of a Bar Code Symbol

The processing of both seed pixel selection subsystem 608 and two-corner location subsystem 600 may also be explained in the context of the example of FIG. 5.

Referring again to the example of FIG. 5, two-corner locating subsystem 600 receives an original seed pixel of pixel (13,6) and a search direction of west. Means 602 of FIG. 6 selects a clockwise sequence orientation, means 604 sets the current seed pixel to be the original seed pixel (13,6), and means 606 starts the list of selected seed pixels.

Referring now to FIG. 8, there is shown a table representing the first twelve processing cycles of location subsystem 600 for the example of FIG. 5. After cycle 1, the list of selected seed pixels maintained by location subsystem 600 contains only the original seed pixel (13,6).

At the beginning of cycle 2, selection subsystem 608 receives as inputs the current seed pixel (13,6), the west search direction, and the clockwise selected sequence orientation. Means 702 of FIG. 7 sets the current neighbor to be pixel (12,6), since that is the neighbor in the west search direction from the current seed pixel (13,6). Since current neighbor (12,6) is a dark pixel and current seed pixel (13,6) is a bright pixel, they are not similar pixels and means 704 directs processing to means 708.

Means 708 selects pixel (12,7) to be the next neighbor by moving clockwise around current seed pixel (13,6) from current neighbor (12,6). Since next neighbor (12,7) is bright, next neighbor (12,7) is not similar to current neighbor (12,6) and means 710 directs processing to means 714. Since next neighbor (12,7) is similar to current seed pixel (13,6), means 714 directs processing to means 716, which selects next neighbor (12,7) to be the next seed pixel. Processing then returns to means 610 of location subsystem 600 to update the list of selected seed pixels by adding next seed pixel (12,7) as reflected at cycle 2 of FIG. 8. Means 612 then selects next seed pixel (12,7) to be the current seed pixel. Since the list of selected seed pixels is only 2 pixels long which is shorter than the preferred selected threshold of 5 pixels, means 614 directs processing back to selection subsystem 608.

In cycle 3, means 702 of selection subsystem 608 uses current seed pixel (12,7) and west search direction to select current neighbor (11,7). After means 704 determines that current neighbor (11,7) is not similar to current seed pixel (12,7), means 708 selects next neighbor (11,8) by moving clockwise around current seed pixel (12,7) from current neighbor (11,7). Since next neighbor (11,8) is similar to current neighbor (11,7), means 710 directs processing to means 712, which sets the current neighbor to be next neighbor (11,8). Processing then returns to means 708, which selects next neighbor (12,8) by moving clockwise around current seed pixel (12,7) from current neighbor (11,8). Since next neighbor (12,8) is not similar to current neighbor (11,8), means 710 now directs processing to means 714, which in turn determines that next neighbor (12,8) is similar to current seed pixel (12,7). Means 716 then sets the next seed pixel to be next neighbor (12,8).

Means 610 then updates the list of seed pixels by adding next seed pixel (12,8), as reflected at cycle 3 of FIG. 8, and means 612 sets the current seed pixel to be next seed pixel (12,8). Since the list of selected seed pixels is still shorter than the selected threshold of 5 pixels, means 614 again returns processing to means 608.

Similarly, in cycles 4 and 5, selection subsystem 608 selects pixels (11,9) and (10,10) as the next two seed pixels and means 610 updates the list of selected seed pixels, as reflected in FIG. 8. In cycle 5, means 614 determines that the list of selected seed pixels is no longer shorter than the selected threshold of 5 pixels and directs processing to means 616, which creates the current vector of (−3,4) by translating to the origin the vector from first seed pixel (13,6) in the list to last seed pixel (10,10) in the list, as reflected in cycle 5 of FIG. 8. The current vector (−3,4) indicates that going from pixel (13,6) to pixel (10,10) requires moving west 3 pixels and north 4 pixels.

Since current vector (−3,4) is the first vector generated by location subsystem 600 for the selected sequence orientation of clockwise, means 618 directs processing to means 620, which saves current vector (−3,4) as the reference vector. Since current vector (−3,4) is identical to reference vector (−3,4), means 622 calculates a vector difference magnitude of 0, as reflected in cycle 5 of FIG. 8.

Since magnitude 0 is less than the selected third threshold, which in the example of FIG. 5 is assumed to be 2.5, means 614 returns processing to selection subsystem 608 for cycle 6. Those skilled in the art will understand that the value selected for the third threshold may be determined empirically off-line by testing location subsystem 600 using various values for the third threshold to process images containing known bar code symbols.

In cycle 6, using current seed pixel (10,10), selection subsystem 608 selects as next seed pixel (9,11) and means 610 updates the list of selected seed pixels by dropping first seed pixel (13,6) and adding next seed pixel (9,11), as reflected in FIG. 8. Means 616 creates current vector (−3,4), means 611 calculates magnitude 0, and means 624 directs processing back to selection subsystem 608 for cycle 7. Similarly, in cycles 7, 8, and 9, selection subsystem 608 selects pixels (9,12), (8,13), and (7,14), respectively, as the next three seed pixels, means 610 updates the list of selected seed pixels, means 616 creates current vectors (−3,4), and means 624 directs processing back to selection subsystem 608 for the next cycle.

In cycle 10, means 702 of selection subsystem 608 sets the current neighbor to be west neighbor (6,14) based on current seed pixel (7,14). Since current neighbor (6,14) is bright, it is similar to current seed pixel (7,14) and means 704 directs processing to means 706, which temporarily reverses the selected sequence orientation. Since the selected sequence orientation was clockwise, means 706 temporarily selects counterclockwise as the sequence orientation. Means 708 then selects next neighbor (6,13) by moving counterclockwise around current seed pixel (7,14) from current neighbor (6,14). Since next neighbor (6,13) is dark, it is not similar to current neighbor (6,14) and means 710 directs processing to means 714. Since next neighbor (6,13) is also not similar to current seed pixel (7,14), means 714 directs processing to means 718, which sets the next seed pixel to be current neighbor (6,14). Means 610 then updates the list of selected seed pixels and means 616 creates current vector (−3,3), as reflected in cycle 10 of FIG. 8. In this case, means 622 calculates a magnitude of 1.0, representing the magnitude of the vector difference between current vector (−3,3) and reference vector (−3,4). Means 624 then directs processing back to selection subsystem 608 for cycle 11, since magnitude 1.0 is less than the selected third threshold of 2.5.

Similarly, in cycle 11, selection subsystem 608 selects next seed pixel (5,13), means 610 updates the list of selected seed pixels, means 616 creates current vectors (−4,1), and means 622 calculates a magnitude of 3.2, as reflected in cycle 11 of FIG. 8. Means 624 determines that magnitude 3.2 is not less than selected third threshold 2.5 and directs processing to means 626. Means 626 selects the pixel corresponding to the detected corner. To ensure that the region defined by the four corners identified by location subsystem 112 contains the entire located bar code symbol, means 626 of location subsystem 600 preferably selects a pixel outside the actual corner of the outside bar of the start/stop character as the detected corner. In the example of FIG. 5, means 626 may select pixel (7,15) as the first corner corresponding to point 214 of FIG. 2 by moving two pixels north and two pixels east from the last selected seed pixel (5,13).

When the search direction is west and the selected sequence is clockwise, location subsystem 600 locates the northeast corner of a bar code symbol and means 626 moves north 2 pixel and east 2 pixels from the last selected seed pixel to ensure selection of a corner pixel that will provide encompassing the entire bar code symbol. Similarly, when the search direction is west and the selected sequence is counterclockwise, location subsystem 600 locates the southwest corner and means 626 moves south and east. When the search direction is east and the selected sequence is clockwise, location subsystem 600 locates the southwest corner and means 626 move south and west. In alternative embodiments, means 626 may move in these directions by other numbers of pixels including zero.

Following selection of the first corner pixel, means 628 determines that only one corner pixel has been selected so far and means 630 then selects the counterclockwise sequence orientation. Location subsystem 600 begins the process of locating the second corner using the counterclockwise sequence orientation in cycle 12 by returning to means 604, which sets the current seed pixel back to original seed pixel (13,6), and to means 606, which starts the list of selected seed pixels over again with only original seed pixel (13,6), as reflected in FIG. 8. Location subsystem 600 continues processing analogous to that for locating the first corner until the second corner is located, at which time, means 628 determines that both corners have been located and processing of location subsystem 600 is complete.

Those skilled in the art will understand that corner location subsystems of the present invention may be used to locate corners of artifacts in pixel images other than bar code symbols. Such artifacts may be of a shape other than a rectangle with right-angle corners.

Decoding Bar Code Symbols

Figure 9:
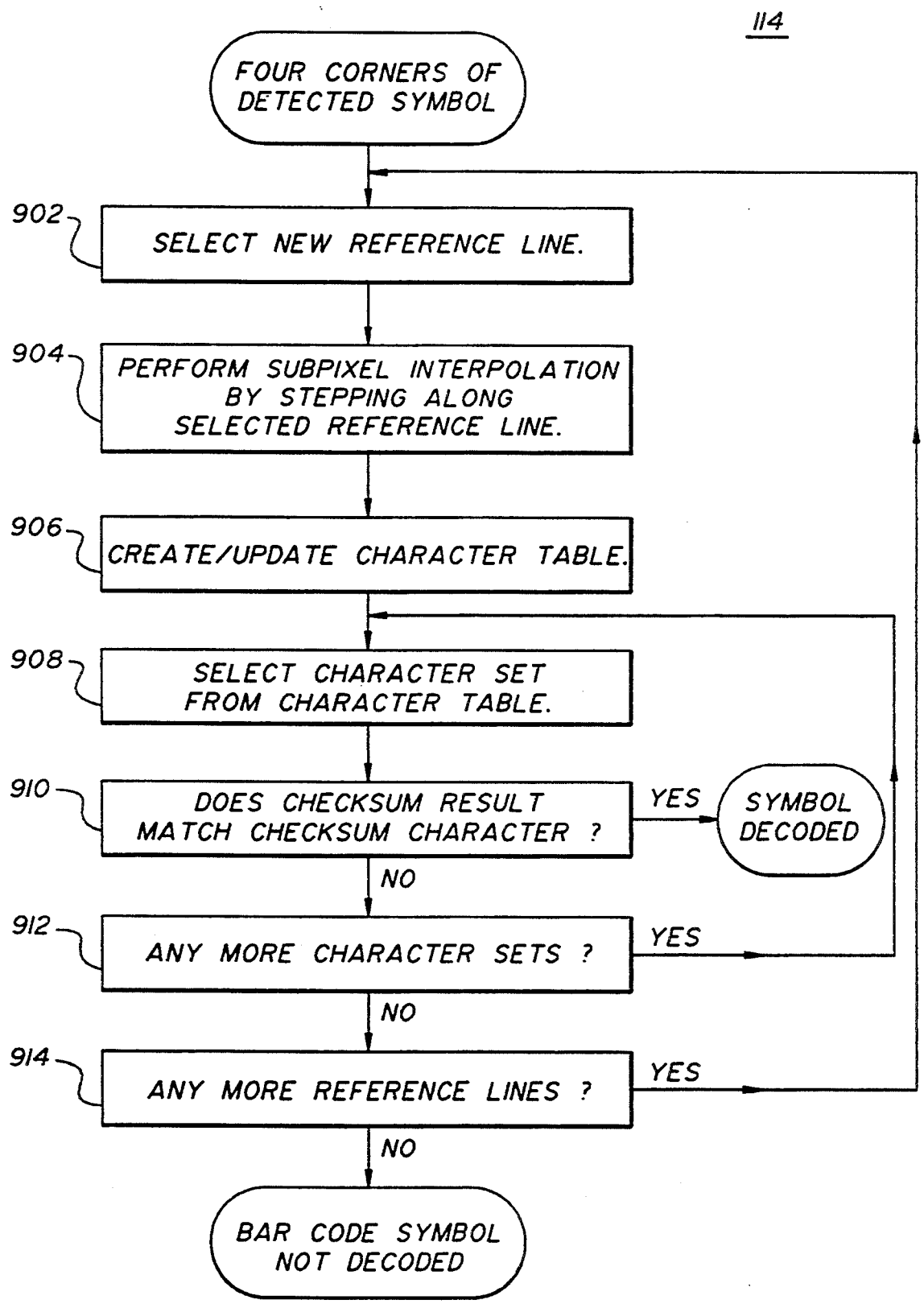
FIG. 9 is a process flow diagram of a bar code symbol decoding subsystem of the detection system of FIG. 1 for decoding a bar code symbol.

Referring now to FIG. 9, there is shown a process flow diagram of bar code symbol decoding subsystem 114 of detection system 100 for decoding a bar code symbol according to a preferred embodiment of the present invention. If four-corner location subsystem 112 of detection system 100 of FIG. 1 locates all four corners of a detected bar code symbol, decoding subsystem 114 decodes the symbol by determining the series of alphanumeric characters that are encoded as bars and spaces in the bar code symbol. Alphanumeric characters may be any possible character and are not limited to only digits and letters of the English alphabet. Decoding subsystem 114 selects a reference line across the randomly oriented bar code symbol and decodes the symbol by stepping along the reference line.

For those symbologies having checksum characters such as Code 128, decoding subsystem 114 selects one or more alphanumeric character choices for each symbol character. Decoding subsystem 114 then performs checksum analysis on sets of alphanumeric characters selected from those character choices. If a character set satisfies the checksum analysis, then that character set is selected as the result of decoding the bar code symbol. If none of the character sets satisfy the checksum analysis, then decoding subsystem 114 selects another reference line for which the process of decoding and checking is repeated. Decoding subsystem 114 continues to select reference lines until the checksum analysis is satisfied, or until a specified stop condition occurs. The stop condition may be a specified resolution between reference lines, a specified number of reference lines, or a specified processing duration, depending upon the requirements of the particular application.

For those symbologies that have no checksum characters, decoding subsystem 114 selects a best alphanumeric character choice for each symbol character. Each of these choices has a corresponding confidence factor. If each of the choices in the set of best choices is "good enough" based on the confidence factors, then decoding subsystem 114 selects that set as the decoding result for the bar code symbol. If one or more choices is not good enough, then decoding subsystem 114 selects another reference line for which the process of decoding is repeated, saving the best choices from each reference line. The selection of reference lines continues until each of the choices is good enough, or until the specified stop condition occurs.

Figure 10:
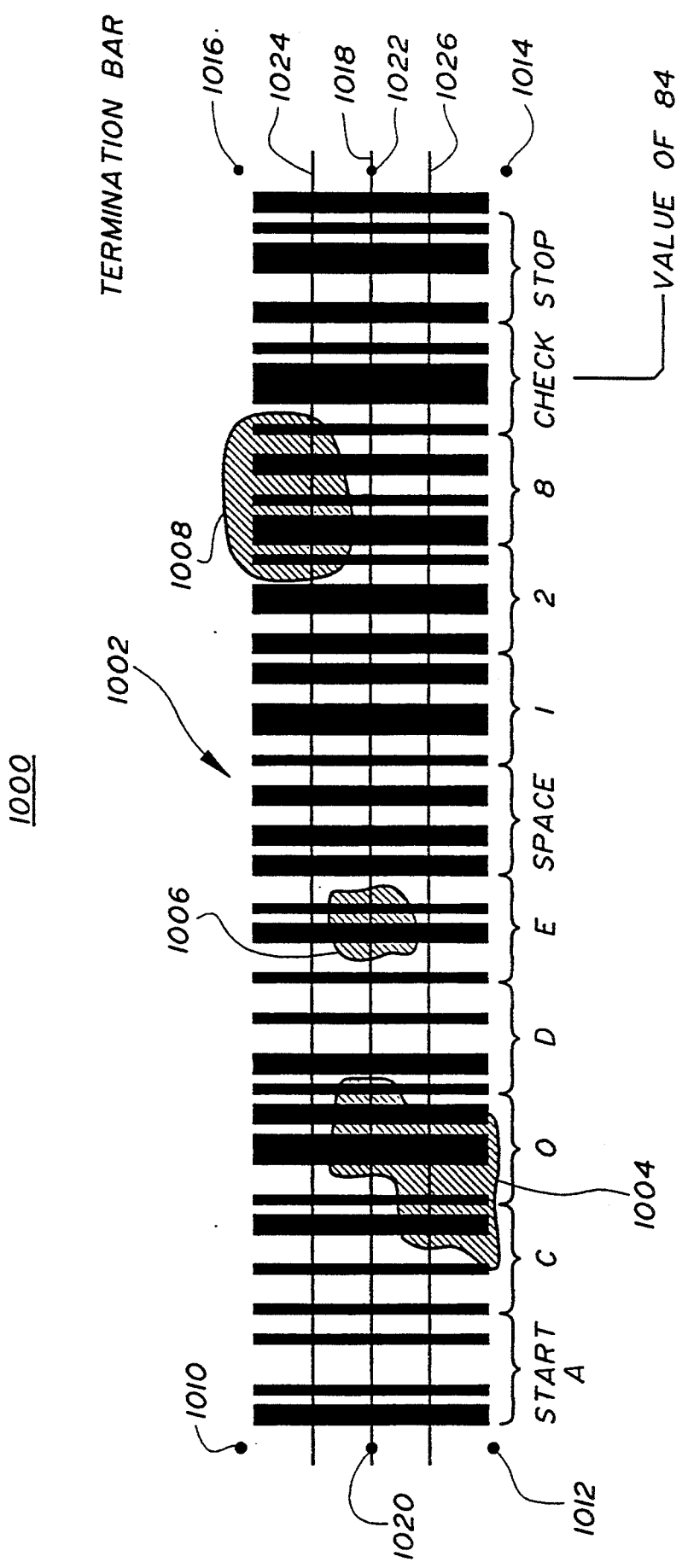
FIG. 10 is a graphical representation of a pixel image containing a degraded bar code symbol.

Referring now to FIG. 10, there is shown a graphical representation of pixel image 1000 containing degraded bar code symbol 1002. Bar code symbol 1002 is a Code 128 symbol encoding the data "CODE 128". In addition to the eight data characters, bar code symbol 1002 includes a start character, a stop character which is considered to include the termination bar, and a checksum character. The checksum character represents the value 84, which is equivalent to the result of performing the appropriate Code 128 checksum computation on the eight data characters of bar code symbol 1002. The checksum character may be used to verify the correctness of the decoding of bar code symbol Bar code symbol 1002 is degraded in regions 1004, 1006, and 1008. Degradations may make bars and spaces appear thinner or thicker than they were intended to be. Such deviations from intended thicknesses may result in errors in decoding bar code symbol 1002 along reference lines that pass through the degraded regions.

Referring again to FIG. 9, in a preferred embodiment, decoding subsystem 114 receives as inputs the four corners of the bar code symbol located by four-corner location subsystem 112. Means 902 then selects a first reference line across the bar code symbol. In general, a reference line preferably runs through a bar code symbol perpendicular to the bars and spaces of that bar code symbol. Thus, a reference line starts at one quiet zone and ends in the other quiet zone of the bar code symbol. In a preferred embodiment, the first reference line is the perpendicular bisecting line, referred to earlier in conjunction with FIGS. 2 and 4, that runs through the center of the bar code symbol.

In the example of FIG. 10, decoding subsystem 114 receives as inputs corners 1010, 1012, 1014, and 1016, which define a region of pixel image 1000 containing bar code symbol 1002. Means 902 selects reference line 1018 as the first reference line for decoding bar code symbol 1002. Reference line 1018 may be the line through points 1020 and 1022, where point 1020 is the midpoint between corners 1010 and 1012 at one end of bar code symbol 1002 and point 1022 is the midpoint between corners 1014 and 1016 at the other end of bar code symbol 1002.

Stepping subsystem 904 then performs subpixel interpolation of bar code symbol 1002 along search steps associated with reference line 1018. Stepping subsystem 904 and subpixel interpolation are described in further detail later in this specification in conjunction with FIGS. 11, 14, and 15. Each symbol character of bar code symbol 1002 is a set of bars and spaces that represents an alphanumeric character. Stepping subsystem 904 selects one or more alphanumeric characters to associate with each symbol character of bar code symbol 1002. In addition, for each symbol character, stepping subsystem 904 assigns to each selected alphanumeric character a confidence factor that indicates how "confident" subsystem 904 is that the symbol character actually represents the selected alphanumeric character.

For example, using reference line 1018, stepping subsystem 904 may determine that the first data character of bar code symbol 1002 should be associated with the alphanumeric character "C" as presented in Table I That character choice is then assigned a particular confidence factor. Stepping subsystem 904 may also determine that the second data character is to be associated with the alphanumeric character "O", which is assigned its own confidence factor.

TABLE I

| CHOICE | DATA CHARACTERS | | | | | | | | CHECK-SUM CHARACTER |
|--------|----|----|----|----|-------|----|----|----|-----|
|        | #1 | #2 | #3 | #4 | #5    | #6 | #7 | #8 |     |
| 1st    | C  | O  | D  | 7  | space | 1  | 2  | 8  | 84  |
| 2nd    |    | W  |    | L  |       |    |    |    |     |
| 3rd    |    |    |    | E  |       |    |    |    |     |

Because bar code symbol 1002 is degraded in regions 1004 and 1006, stepping subsystem 904 may generate one or more alphanumeric character choices for each of the other data characters using reference line 1018. For example, stepping subsystem 904 may generate a first or best choice of "O" and a second best choice of "W" for the second data character of bar code symbol 1002, because reference line 1018 passes through degraded region 1004 at the second data character. The relative values of the assigned confidence factors may indicate that stepping subsystem 904 is "more confident" that the second data character actually represents the alphanumeric character "O" than that it actually represents the alphanumeric character "W". Similarly, stepping subsystem 904 may generate best, second best, and third best choices "7", "L" and "E", respectively, for the fourth data character of bar code symbol 1002 due to the adverse results of degraded region 1006.

When the first reference line is selected, means 906 creates a character table of the alphanumeric characters and associated confidence factors assigned by stepping subsystem 904. Each column of the character table corresponds to a different symbol character and each column contains the alphanumeric characters associated with that symbol character arranged from highest confidence to lowest confidence, that is, from best choice to worst choice.

After means 906 creates the character table, means 908 selects a character set from the character table. Initially, means 908 selects the set of first-choice characters from the character table. Each character in this set of first-choice characters is the best or first choice, that is, the alphanumeric character with the highest confidence, for each symbol character represented in the character table.

Means 910 then performs a checksum computation on that selected set of alphanumeric characters and compares the result to the checksum character. If means 910 determines that the checksum result matches the checksum character, then the bar code symbol is decoded and processing of decoding subsystem 114 is concluded. Otherwise, the checksum analysis is not satisfied and means 912 determines whether there are any more sets of character choices in the character table to check. If so, then means 908 selects a next character set from the character table for checksum analysis by means As described above, each symbol character may have one or more associated alphanumeric characters in the character table. Decoding subsystem 114 may test other sets of alphanumeric characters, other than the first-choice character set, against the checksum character. In a preferred embodiment, each of these other character sets consists of the first-choice alphanumeric character for each symbol character except for one symbol character which is represented by one of its other choices. Decoding subsystem 114 tests these other character sets until one is found that satisfies the checksum analysis.

If there are no more character sets to be tested, then means 914 determines whether any more reference lines are to be selected. Depending upon the requirements of the particular application, the selection of reference lines may be continued until a specified resolution between reference lines has been reached, or until a specified number of reference lines have been selected, or until a specified processing time has expired, whichever criterion is desired. In a preferred embodiment, up to three reference lines are selected to decode a detected bar code symbol. If there are more reference lines, then means 902 selects a next reference line for further subpixel interpolation by stepping subsystem 904. Otherwise, all reference lines have been selected and decoding subsystem 902 fails to decode the bar code symbol.

In the example of FIG. 10, Table I may represent the character choices created by means 906 using reference line 1018. Means 908 first selects the set of first-choice characters corresponding to character set {"C", "O", "D", "7", space "1", "2", "8", "84"}. Means 910 then performs checksum analysis on the selected character set. Since the checksum result of means 910 does not match the checksum character "84", the checksum analysis is not satisfied. Means 912 then determines whether the character table contains any more character sets. In a preferred embodiment of decoding subsystem 114, if the set of first-choice characters fails the checksum analysis, then selected other character sets are tested.

After the first-choice character set fails the checksum analysis, means 912 determines that there are other character sets in the character table and means 908 selects another character set from the character table. In the example of Table I, means 908 may select {"C", "W", "D", "7", space, "1", "2", "8", "84"} as the next character set to be tested. This set represents the first choice for each symbol character except for data character #2, for which the second choice is selected. Means 910 performs the checksum computation on this character set and determines that it too fails the checksum analysis. Again, means 912 determines that the selected character set is not the last character set and means 908 may select {"C", "O", "D", "L", space, "1", "2", "8", "84"} as the next character set. This character set also fails the checksum analysis of means 910 and {"C", "O", "D", "E" space "1", "2", "8", "84"} is then select by means 908 to be the next character set.

Since {"C", "O", "D", "E" space "1", "2", "8", "84"} is the correct character set, it satisfies the checksum analysis of means 910, that is, the result of the checksum computation performed on the data characters of that set of characters is "84", the value of the checksum character At this point, bar code symbol 1002 is decoded and processing of decoding subsystem 114 is concluded. If it turned out for some reason, however, that region 1006 was so degraded that, for reference line none of the character sets selected by means 908 satisfies the checksum analysis, then means 914 determines whether there are any more reference lines to be used to decode bar code symbol 1002. The number of reference lines to be used may be dictated by the processing requirements of the particular application. In one embodiment, up to 20 reference lines are selected.

After means 914 determines that reference line 1018 is not the last reference line to be selected, means 902 may select reference line 1024 as the next reference line, where reference line 1024 is preferably the line midway between reference line 1018 and the line defined by corners 1010 and 1016. Stepping subsystem 904 then decodes by stepping along reference line 1024. As before, this decoding may result in one or more alphanumeric characters and associated confidence factors for each symbol character in bar code symbol 1002. Means 906 then updates the character table using the results for reference line 1024 and the results previously generated for reference line 1018.

As described in further detail later in this specification in conjunction with FIG. 11, in a preferred embodiment, the confidence factors are distance measures reflecting deviations from ideal characters. As such, a small confidence factor implies a smaller deviation from an ideal alphanumeric character and a higher level of confidence that that ideal alphanumeric character is the correct character. In a preferred embodiment, means 906 updates the character table by generating a effective confidence factor R for each alphanumeric choice according to the equation:

$$\frac{1}{R} = \Sigma \frac{1}{R_i}, \quad (1)$$

where the $R_i$ are the confidence factors for that alphanumeric choice using different reference lines. The character table is then updated by arranging the choices according to their effective confidence factors.

For example, assume that, for one of the symbol characters in a bar code symbol, two alphanumeric choices are generated using the first reference line: the letter "A" with a confidence factor of 0.5 and the letter "B" with a confidence factor of 0.8. After this first reference line, "A" is the first choice and "B" is the second choice, because "A" has the smaller confidence factor. Assume further that using the second reference line results in two more choices for the same symbol character: "B" with a confidence factor of 0.8 and "C" with a confidence factor of 0.6. In this case, means 906 updates the character table for this symbol character by retaining "A" with a confidence factor of 0.5, adding "C" with a confidence factor of 0.6, and updating the confidence factor R for "B" to 0.4, according to Equation (1), where:

$$\frac{1}{R} = \frac{1}{0.8} + \frac{1}{0.8}. \quad (2)$$

Since "B" now has the smallest effective confidence factor, it becomes the first choice in the character table, followed by "A" and "C". Those skilled in the art will understand that the character table may be updated using alternative methods that are within the scope of the present invention.

The updated character table is then processed by means 908, 910, and 912, as described before. If none of the character sets selected by means 908 from the updated character table satisfies the checksum analysis, then another reference line 1026 may be selected and the procedure of stepping, updating, and checksum analyzing repeated.

In a preferred embodiment, the checksum character in the character table is represented by only a first choice alphanumeric character. In an alternative preferred embodiment, the checksum character may have one or more choices in addition to the first choice. In such cases, the checksum character may be treated as any other character in generating character sets for checksum analysis.

Stepping Along a Reference Line To Decode a Bar Code Symbol

Figure 11:
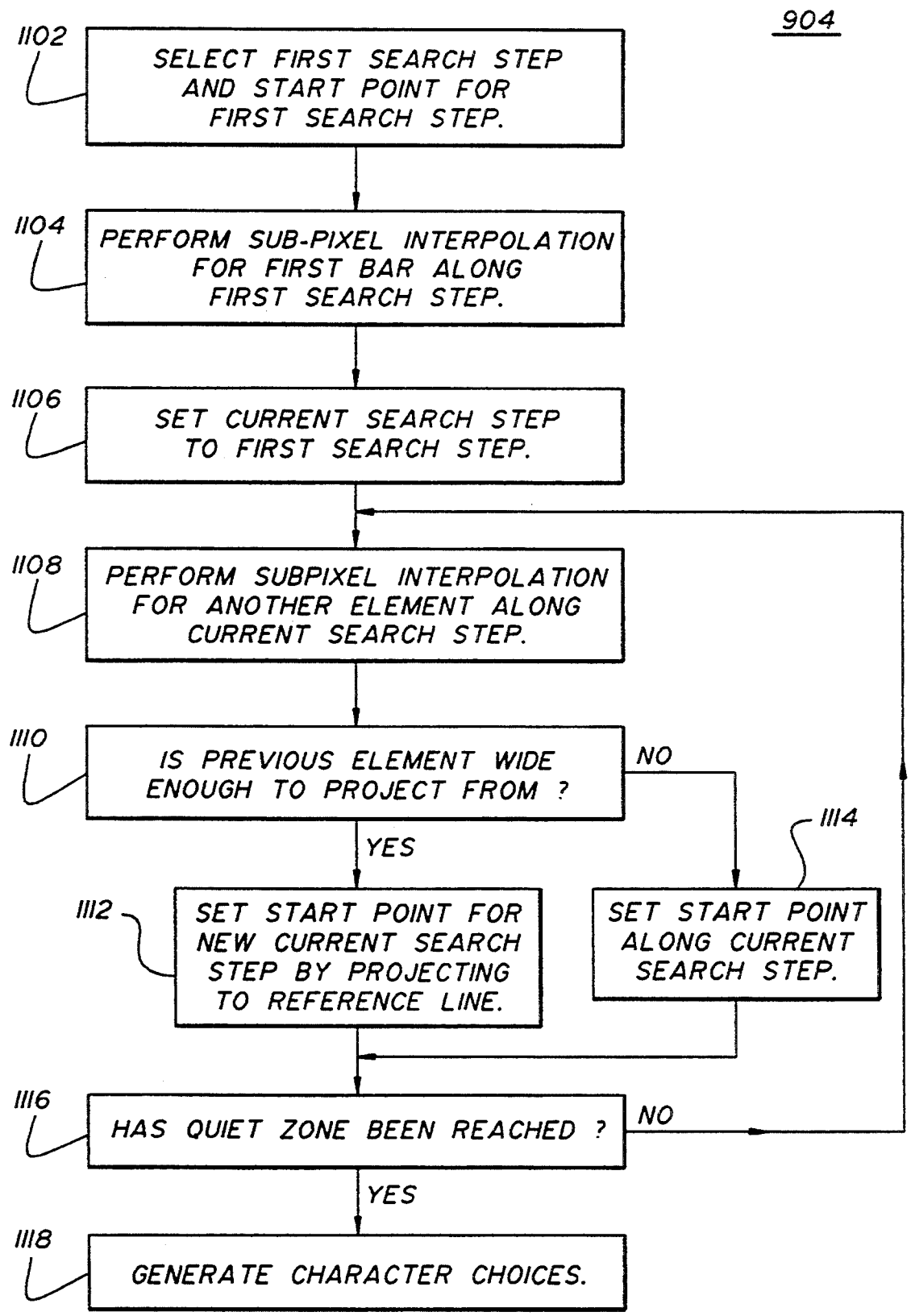
FIG. 11 is a process flow diagram of a stepping subsystem of the bar code symbol decoding subsystem of FIG. 9 for stepping along a reference line and decoding a bar code symbol.

Referring now to FIG. 11, there is shown a process flow diagram of stepping subsystem 904 of bar code symbol decoding subsystem 114 for stepping along a selected reference line and decoding a bar code symbol according to a preferred embodiment of the present invention. Since the bar code symbols to be detected and decoded by detection system 100 may be randomly oriented relative to the rows and columns of pixels in the pixel image, the reference lines selected by decoding subsystem 114 are typically not aligned with pixels rows or columns.

In order to preserve the information content of these pixel images, decoding subsystem 114 decodes bar code symbols by performing subpixel interpolation along a series of search steps. Each search step is a portion of a pixel row or column that starts at the intersection of the pixel row or column and the selected reference line. If the reference line is oriented to the pixel rows of the pixel image with an angle magnitude of less than 45 degrees, then the search steps are portions of pixel rows. Otherwise, the search steps are portions of pixel columns.

Figure 12:
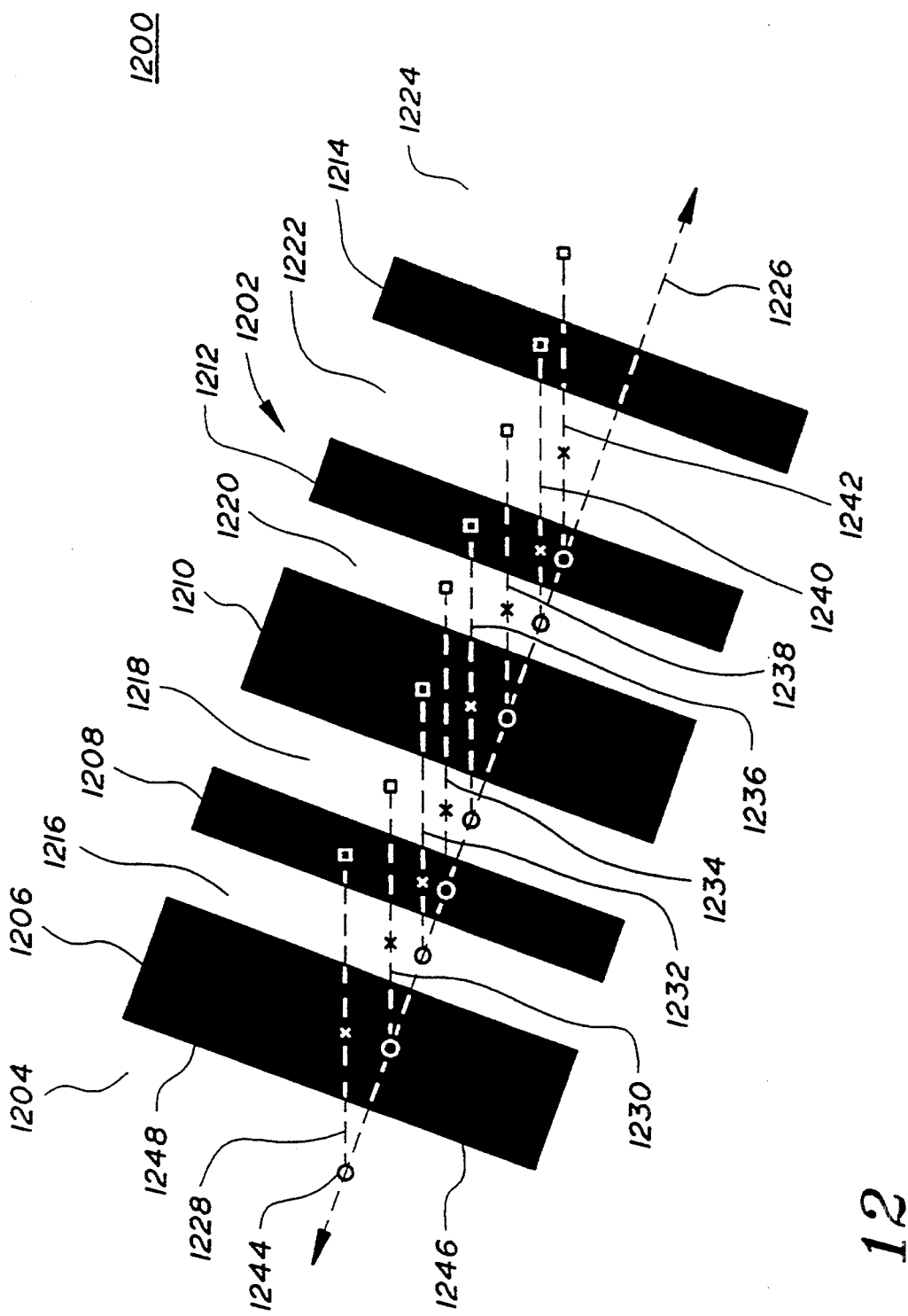
FIG. 12 is a graphical representation of a pixel image containing a portion of a bar code symbol that is not aligned with either the pixel rows or columns of the pixel image.

Referring now to FIG. 12, there is shown a graphical representation of pixel image 1200 containing quiet zone 1204 and a portion of bar code symbol 1202 which is not aligned with either the pixel rows or columns of pixel image 1200. Bar code symbol 1202 includes bars 1206 through 1214, and spaces 1216 through 1224. FIG. 12 also shows reference line 1226 and search steps 1228 through 1242. Reference line 1226 is analogous to reference lines 1018, 1024, and 1026 of FIG. 10.

Figure 13:
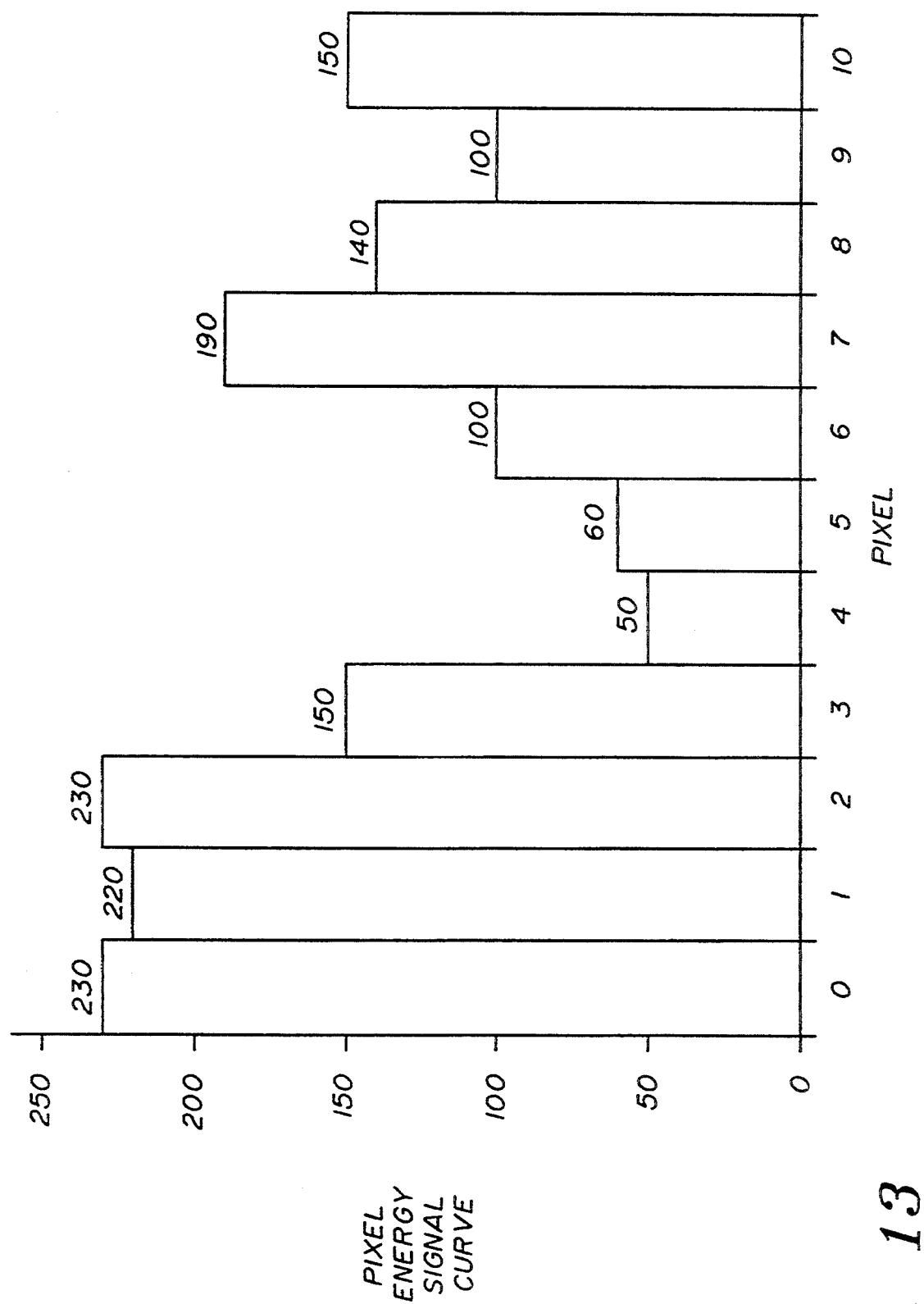
FIG. 13 is a graphical representation of the pixel intensity levels of 11 pixels in a search step of the pixel image of FIG. 12.

Referring now to FIG. 13, there is shown a graphical representation of the pixel intensity levels of 11 pixels in search step 1228 of pixel image 1200. Each pixel along search step 1228 has a corresponding intensity level representative of its brightness. In order to facilitate explanation, stepping subsystem 904 is described in the context of the example of FIGS. 12 and 13.

Stepping subsystem 904 of FIG. 11 begins with means 1102 which selects the first search step and the start point for the first search step. The first search step is preferably a row or column of pixels that intersects the reference line at the state transition between a quiet zone and a start/stop character of the detected bar code symbol. The start point is preferably the pixel that corresponds to the point of intersection. In FIG. 10, point 1020 may be the start point of the first search step when using reference line 1018 to decode bar code symbol 1002. Similarly, in FIG. 12, point 1244 may be the start point of first search step 1228 when using reference line 1226 to decode bar code symbol 1202. Search step 1228 forms part of the row of pixels that intersects reference line 1226 at point 1244.

After means 1102 selects the start point of the first search step, means 104 performs subpixel interpolation along the first search step to determine a signal energy value that represents the width of the first bar of the bar code symbol. In the example of FIG. 12, means 1104 performs subpixel interpolation along search step 1228 to determine a signal energy value for bar 1206 of bar code symbol 1201. The higher the signal energy value, the wider the symbol element. Subpixel interpolation is further described later in this specification in conjunction with FIGS. 14 and 15.

Means 1106 sets the current search step to be the first search step. Means 1108 then performs subpixel interpolation for another element along the current search step, where elements are analyzed by means 1108 in the order in which they appear in the bar code symbol. Means 1110 then determines whether subpixel interpolation for the next element is to be performed along the current search step or whether a new current search step is to be selected. A new current search step is selected if the next-to-last analyzed element is wide enough to project from. For example, where the last analyzed element was a space, a new current search step is selected to analyze the bar that immediately follows that space, if the bar that immediately precedes that space is wide enough from which to project.

To make this determination, means 1110 compares the signal energy value for the previous symbol element to a fourth threshold. The fourth threshold is preferably equivalent to at least two times the width of the narrowest bar code symbol element. If means 1110 determines that the signal energy value for the next-to-last analyzed element is larger than the fourth threshold, then means 1112 selects the start point for a new current search step by projecting from the center of the next-to-last analyzed element onto the reference line. Otherwise, means 1114 selects the start point along the current search step as the center of the next-to-last analyzed element.

After the start point is selected either by means 1112 or 1114, means 1116 determines whether stepping along the reference line is complete by checking whether the quiet zone has been reached. If so, character determination subsystem 1118 generates the alphanumeric character choices and confidence factors associated with each symbol character of the bar code symbol. At that point, processing by stepping subsystem 904 is complete. Character determination subsystem 1118 is further described later in this specification in conjunction with FIG. 16.

In the example of FIG. 12, means 1110 may determine that the signal energy value for bar 1206 is greater than the fourth threshold. Means 1112 may then select start point 1246 of search step 1230 as the start point for the new current search step by projecting from point 1248 of search step 1228 onto reference line 1226. For example, where bar code symbol elements have a minimum width of 0.015 inches, the fourth threshold may be equivalent to 0.030 inches. The projection from search step 1228 to reference line 1226 is preferably perpendicular to reference line 1226. If reference line 1226 is characterized by slope k and intercept n and center point 1248 is represented by point $(x_1, y_1)$, then the projection line from center point 1248 is characterized by slope $k_1$ and intercept $n_1$, where:

$$k_1 = -\frac{1}{k} \qquad (3)$$

and $$n_1 = y_1 - k_1 x_1. \qquad (4)$$

Start point 1246 may be represented by the point $(x_2, y_2)$, where:

$$x_2 = \frac{n - n_1}{k_1 - k} \qquad (5)$$

and $$y_2 = k_1 x_2 + n_1. \quad (6)$$

After means 1116 determines that the quiet zone has not been reached, means 1108 performs subpixel interpolation for bar 1208 along search step 1230.

Otherwise, if the signal energy value for bar 1206 is not greater than the fourth threshold, then means 1114 sets the start point for subpixel interpolation to the center of bar 1206 along current search step 1228. After means 1116 determines that quiet zone has not been reached, means 1108 calculates the signal energy value for bar 1208 along current search step 1228. Subpixel interpolation of subsequent symbol elements continues along search step 1228 until the next-to-last analyzed element is a bar or space of sufficient width, in which case, means 1112 then projects from the center of that element onto reference line 1226 to select the start point of the new current search step. In this way, stepping subsystem 904 determines signal energy values for each symbol element of bar code symbol 1202.

Subpixel Interpolation of Bar Code Symbol Elements

Referring now to FIGS. 14 and 15, there are shown process flow diagrams of subpixel interpolation subsystems 1400 and 1500 of the present invention for calculating signal energy values for bars and spaces, respectively. If the bar code symbol element to be analyzed is a bar, means 1108 of stepping subsystem 904 implements subpixel interpolation subsystem 1400 to determine a signal energy value for the region from the center of the space that immediately precedes the bar to the center of the space that immediately follows the bar. Similarly, if the symbol element to be analyzed is a space, means 1108 implements subsystem 1500 to determine an signal energy value for the region from the center of the bar that immediately precedes the space to the center of the bar that immediately follows the bar.

When a bar is to be analyzed, means 1402 of subpixel interpolation subsystem 1400 locates a first peak corresponding to the center of the space immediately preceding the bar to be analyzed. When analyzing any bar other than the first bar of a bar code symbol, a peak generally represents a pixel intensity level maximum with respect to adjacent pixels. When analyzing the first bar, the first peak is preferably a bright pixel near the end of the quiet zone abutting the first bar. Means 1404 then locates a second peak corresponding to the center of the space immediately following the bar to be analyzed. The two peaks are adjacent critical points along a one-dimensional signal curve that represents a portion of the current search step that is centered on the bar to be analyzed.

Means 1406 then computes the area above the gray-scale signal curve between the two peaks by numerically integrating using the pixel intensity levels. This area is the signal energy value of the bar being analyzed. In making this integration computation, means 1406 preferably uses the maximum pixel intensity level from the histogram generated by means 102 of detection system 100 of FIG. 1 as the upper limit for computing the area above the curve. In general, the signal energy value $b_i$ for a bar is given by:

$$b_i = \frac{(I_{max} - I_{peak\#1})}{2} + \Sigma(I_{max} - I_p) + \frac{(I_{max} - I_{peak\#2})}{2}, \quad (7)$$

where $I_{max}$ is the maximum pixel intensity level from the histogram, $I_{peak\#1}$ is the pixel intensity level of the pixel corresponding to the first peak, $I_{peak\#2}$ is the pixel intensity level of the pixel corresponding to the second peak, and $I_p$ are the pixel intensity levels of the pixels lying between the first and second peaks along the current search step.

In the example of FIGS. 12 and 13, stepping subsystem 904 implements subpixel interpolation subsystem 1400 along search step 1228 to determine the signal energy value for bar 1206. Since bar 1206 is the first bar in bar code symbol 1202, means 1402 preferably selects as the first peak a pixel near the end of quiet zone 1204, such as pixel 2 in FIG. 13. Means 1404 then locates the second peak which is at the center of space 1216, immediately following bar 1206. Means 1404 may select pixel 7 in FIG. 13 as that second peak. Means 1406 then computes the signal energy value for bar 1206 using Equation (7). Assume, for example, that the histogram for the pixel image containing bar code symbol 1202 indicates that the maximum pixel intensity level $I_{max}$ is 240. The signal energy value $b_i$ for bar 1206 from means 1406 is then given by:

$$b_i = \frac{(240 - 230)}{2} + (240 - 150) + (240 - 50) + \quad (8)$$

$$(240 - 60) + (240 - 100) + \frac{(240 - 190)}{2} = 630.$$

Similarly, when a space is to be analyzed, means 1502 of subpixel interpolation subsystem 1500 locates a first valley corresponding to the center of the bar immediately preceding the space to be analyzed. A valley generally represents a pixel intensity level minimum with respect to adjacent pixels. Means 1504 then locates a second valley corresponding to the center of the bar immediately following the space to be analyzed. The two valleys are adjacent critical points along a one-dimensional signal curve that represents a portion of the current search step that is centered on the space to be analyzed.

Means 1506 then computes the area under the gray-scale signal curve between the two valleys by numerically integrating using the pixel intensity levels. This area is the signal energy value of the space being analyzed. In making this integration computation, means 1506 preferably uses the minimum pixel intensity level from the histogram generated by means 102 of detection system 100 of FIG. 1 as the lower limit for computing the area under the curve. In general, the signal energy value $s_i$ for a space is given by:

$$s_i = \frac{(I_{valley\#1} - I_{min})}{2} + \Sigma(I_p - I_{min}) + \frac{(I_{valley\#2} - I_{min})}{2}, \quad (9)$$

where $I_{min}$ is the minimum pixel intensity level from the histogram, $I_{valley\ \#1}$ is the pixel intensity level of the pixel corresponding to the first valley, $I_{valley\ \#2}$ is the pixel intensity level of the pixel corresponding to the second valley, and $I_p$ are the pixel intensity levels of the pixels lying between the first and second valleys along the current search step.

In the example of FIGS. 12 and 13, stepping subsystem 904 implements subpixel interpolation subsystem 1500 along search step 1228 to determine the signal energy value for space 1216. Means 1502 locates the first valley which is at the center of bar 1206, immediately preceding space 1216. Means 1502 may select pixel 4 in FIG. 13 as the first valley. Means 1504 then locates the second valley which is at the center of bar 1208, immediately following space 1216. Means 1504 may select pixel 9 in FIG. 13 as that second valley. Means 1506 then computes the signal energy value for space 1216 using Equation (9). Assume, for example, that the histogram for the pixel image containing bar code symbol 1202 indicates that the minimum pixel intensity level $I_{min}$ is 50. The signal energy value $s_i$ for space 1216 from means 1506 is then given by:

$$s_i = \frac{(50-50)}{2} + (60-50) + (100-50) + \quad (10)$$

$$(190-50) + (140-50) + \frac{(100-50)}{2} = 315.$$

Determining Character Choices from Subpixel Interpolation Results

After subpixel interpolation has been performed for all of the symbol elements of the detected bar code symbol, character determination subsystem 1118 of stepping subsystem 904 determines the alphanumeric character choices for each of the symbol characters. Subpixel interpolation generates a signal energy value for each bar and space of the detected bar code symbol. Combinations of bars and spaces in the bar code symbol correspond to symbol characters. Character determination subsystem 1118 uses the signal energy values to determine one or more choices of alphanumeric characters for each of the symbol characters. Subsystem 1118 also computes a confidence factor for each alphanumeric character choice. These character choices and confidence factors are then used by decoding subsystem 114 to create and update the character table used in the checksum analysis described above.

Each bar code symbology has a particular format for the encoding of alphanumeric characters into bars and spaces. In this specification, subsystem 1118 is described in the context of decoding bar code symbols of Code 128 Symbology, although those skilled in the art will understand that the present invention may also employ analogous processing to decode any known symbology. In Code 128 Symbology, each alphanumeric character is represented by a symbol character having three bars and three spaces. The width of every symbol character is 11 modules, where each symbol element (bar or space) is an integral number of modules wide and the minimum width for a symbol element is 1 module. In addition, the sum of the widths of the three bars is always an even number of modules, while the sum of the three space widths is always an odd number of modules. Character determination subsystem 1118 generates one or more choices of alphanumeric characters for each symbol character of three bars and three spaces.

Figure 16:
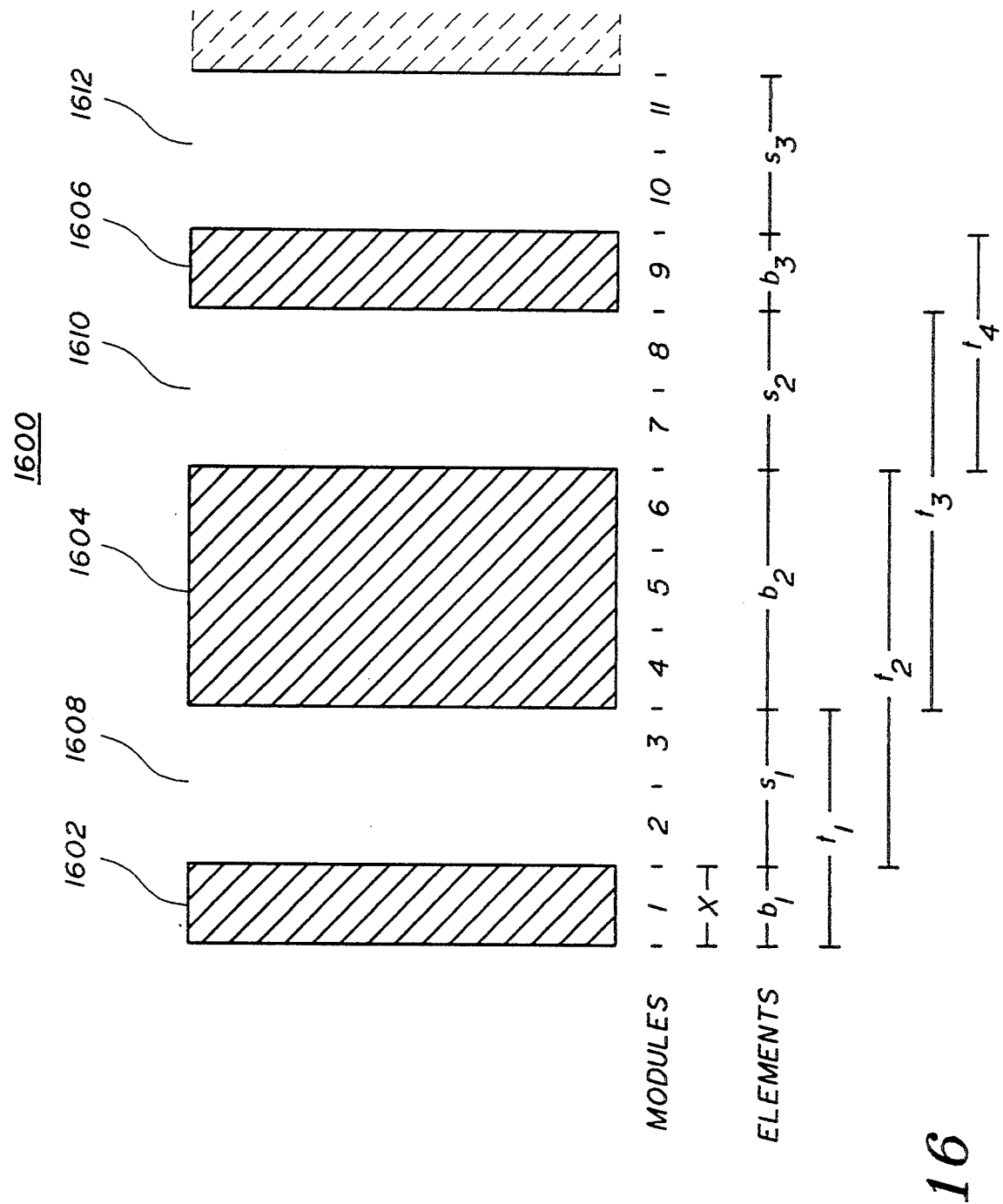
FIG. 16 is a graphical representation of a bar code symbol character consisting of three bars and three spaces.

Referring now to FIG. 16, there is shown a graphical representation of bar code symbol character 1600 consisting of three bars 1602, 1604, and 1606, and three spaces 1608, 1610, and 1612. The widths of the symbol elements of symbol character 1600 may be represented by signal energy values $b_1$, $b_2$, $b_3$ for the three bars and $s_1$, $s_2$, $s_3$ for the three spaces. These signal energy values are generated by subpixel interpolation performed by decoding subsystem 114. Character determination subsystem 1118 determines a 1-module value X equivalent to 1 module for symbol character 1600, where:

$$X = \frac{1}{11}(b_1 + s_1 + b_2 + s_2 + b_3 + s_3). \quad (11)$$

Subsystem 1118 then forms four measured widths $t_1$, $t_2$, $t_3$, $t_4$ from the signal energy values generated by decoding subsystem 114 and the 1-module value X, where:

$$t_1 = \frac{1}{X}(b_1 + s_1) \quad (12)$$

$$t_2 = \frac{1}{X}(s_1 + b_2)$$

$$t_3 = \frac{1}{X}(b_2 + s_2)$$

$$t_4 = \frac{1}{X}(s_2 + b_3).$$

Each width $t_i$ corresponds to the width along symbol character 1600 from one symbol element edge to the next symbol element edge of the same type. For example, the width $t_1$ corresponds to the number of modules from the leading edge of bar 1602 to the leading edge of the next bar—bar 1604. Similarly, the width $t_2$ corresponds to the number of modules from the leading edge of space 1608 to the leading edge of the next space—space Since bars and spaces are integral numbers of modules wide, ideally the widths $t_i$ are integers from 2 to 7. In practice, however, noise may cause deviations from these ideal widths.

Subsystem 1118 compares each measured width $t_i$ to the ideal widths to assign one or more ideal widths and deviations from those ideal widths to the measured width. For example, an ideal width of 2.0 may be associated with measured widths $t_i$ from 1.3 to 2.7. Similarly, an ideal width of 3.0 may be associated with measured widths $t_i$ from 2.3 to 3.7. Some measured widths may be associated with more than one ideal width, e.g., a measured width of 2.5 would be associated both with ideal width 2.0 and ideal width 3.0 . Those skilled in the art will understand that these ranges may be selected empirically by testing various ranges with known bar code symbols.

Assume that the set of measured widths $\{t_1, t_2, t_3, t_4\}$ derived by subpixel interpolation of character symbol 1600 of FIG. 16 is $\{2.45, 5.2, 4.9, 2.9\}$. Subsystem 1118 may select the ideal set $\{2.0, 5.0, 5.0, 3.0\}$ for this measured set. In that case, a distance measure reflecting the deviations from ideal is the sum of the absolute differences between the ideal set and the measured set, that is, $(|12.45-2.0|+|5.2-5.0|+|14.9-5.0|+|2.9-3.0|)$ or 0.85. This distance measure may be used by decoding subsystem 114 as the confidence factor for the alphanumeric character corresponding to the ideal set $\{2.0, 5.0, 5.0, 3.0\}$. The closer the measured set is to the ideal set, the smaller the distance measure or confidence factor, and the greater the confidence that the measured set is the ideal set. If no alphanumeric character corresponds to that ideal set, then subsystem 1118 does not select that ideal set as a possible choice for the current symbol character.

Subsystem 1118 will generate alternative choices when the measured widths $t_i$ fall within the ranges of more than one ideal width. Since the measured width $t_i$ in character symbol 1600 is 2.45, it falls within the ranges for both a 2.0 and a 3.0. Thus, measured width $t_i$ may correspond to a 3.0 instead of a 2.0, and a possible alternative choice for the measured set is the ideal set {3.0, 5.0, 5.0, 3.0}. The confidence factor for the alphanumeric character associated with this second ideal set is 0.95. Since the previous character choice has a lower confidence factor than this character choice, the previous character would be the first choice in the character table created by decoding subsystem 114. Other characters are also possible, but assuming the other measured widths $t_i$ lie within the ranges of only one ideal width each, subsystem 1118 does not select further alternative choices.

Subsystem 1118 decodes each of the symbol characters in a detected Code 128 bar code symbol by performing similar analysis on each set of three bars and three spaces corresponding to a symbol character. The resulting alphanumeric character choices and associated confidence factors are used by means 906 of decoding subsystem 114 to create and update the character table used to generate character sets for checksum analysis.

Decoding Bar Code Symbols by Stitching

Figure 17:
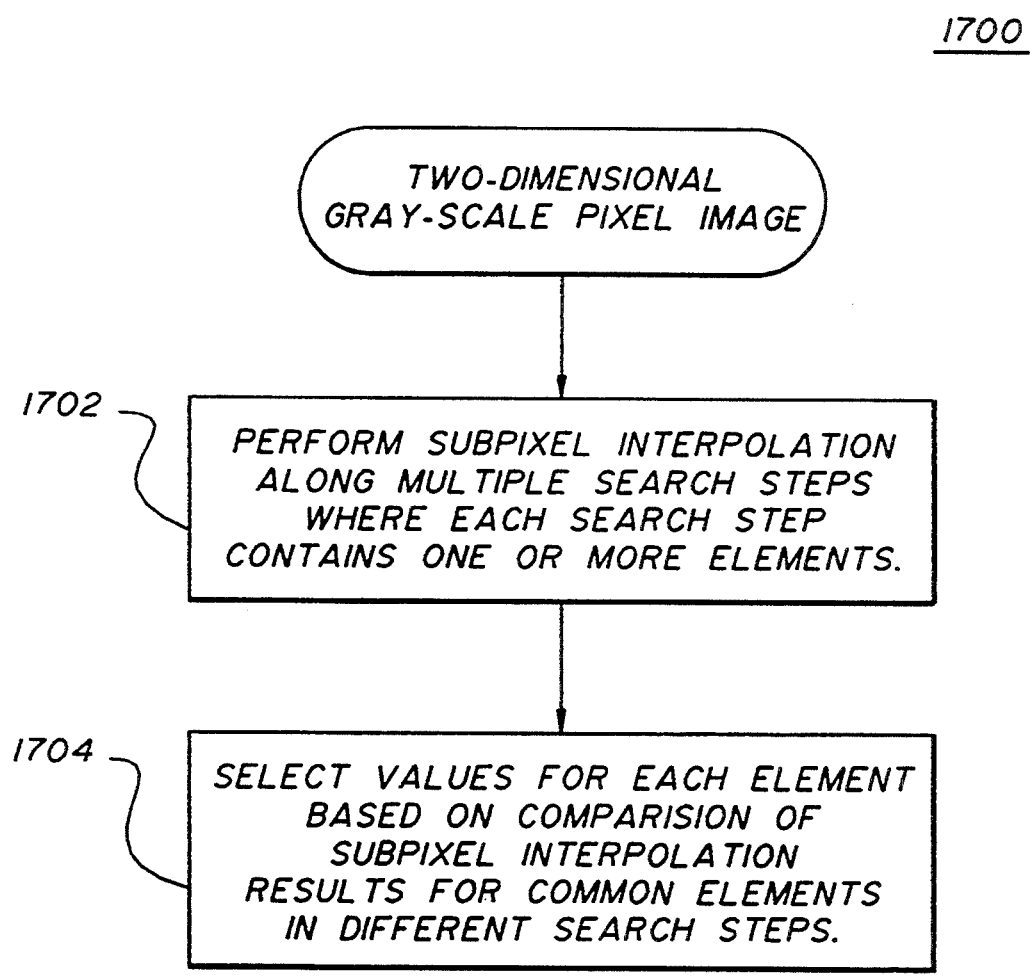
FIG. 17 is a process flow diagram of a stitching subsystem for decoding bar code symbols by stitching according to a preferred embodiment of the present invention.

Referring now to FIG. 17, there is shown a process flow diagram of stitching subsystem 1700 for decoding bar code symbols by stitching according to a preferred embodiment of the present invention. Stitching subsystem 1700 functions substantially in accordance with stepping subsystem 904 except that stitching subsystem 1700 uses each search step to perform subpixel interpolation of two or more symbol elements of the detected bar code symbol and each search step has one or more symbol elements in common with at least one other search step. That is, there is overlapping of symbol elements between successive search steps. Stitching subsystem 1700 determines the signal energy values to assign to each symbol element by comparing the redundant signal energy values that may exist for that symbol element from two or more different subpixel interpolations.

In a preferred embodiment, means 1702 performs subpixel interpolation along multiple search steps that may be selected by projecting onto a reference line similarly to that performed by stepping subsystem 904. Each search step is used to determine the signal energy value for two or more symbol elements. As opposed to stepping subsystem 904, which starts the next search step from where the previous search step left off, stitching subsystem 1700 purposely repeats subpixel interpolation for symbol elements that have been previously analyzed. Thus, the search steps of stitching subsystem 1700 overlap, where those for stepping subsystem 904 follow end to end.

Means 1704 then compares the redundant results for each symbol element of the bar code symbol to select a single signal energy value for that symbol element. In a preferred embodiment, this selection may be performed by averaging the redundant signal energy values. In alternative embodiments, other types of statistical analysis may be performed to select a single signal energy value for each symbol element. After each symbol element is assigned a signal energy value, character determination subsystem 1118 of FIG. 11 may then generate character choices for use by decoding subsystem 114 as described earlier in this specification.

Figure 18:
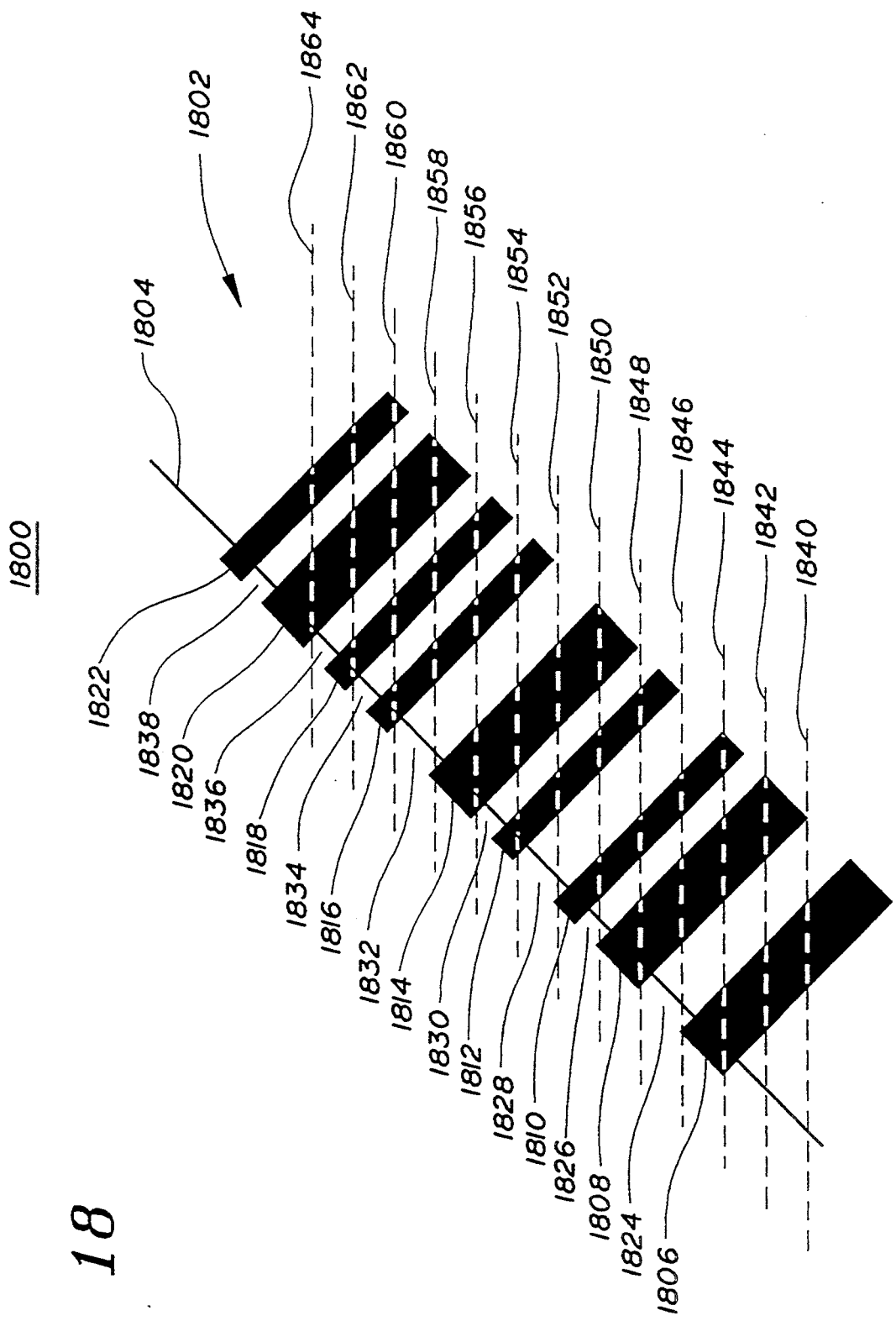
FIG. 18 is a graphical representation of a pixel image containing a bar code symbol which is not aligned with either the pixel rows or columns of the pixel image.

Referring now to FIG. 18, there is shown a graphical representation of pixel image 1800 containing bar code symbol 1802 which is not aligned with either the pixel rows or columns of pixel image 1800. Bar code symbol 1802 contains bars 1806 through 1822 and spaces 1824 through 1838. Stitching subsystem 1700 may decode bar code symbol 1802 by stepping along reference line 1804 to perform subpixel interpolation along search steps 1840 through 1864. With each search step, means 1702 generates energy signal values for one or more elements of bar code symbol 1802. For example, means 1702 may perform subpixel interpolation along search step 1840 to generate energy signal values for bar 1806 and space 1824. Similarly, means 1702 may perform subpixel interpolation along search step 1842 to generate energy signal values for bars 1806 and 1808 and space 1814. Table II contains the elements of bar code symbol 1802 that may be characterized along search steps 1840 through 1864.

TABLE II

| SEARCH STEP | ELEMENTS |
|---|---|
| 1840 | 1806, 1824 |
| 1842 | 1806, 1824, 1808 |
| 1844 | 1824, 1808, 1826, 1810 |
| 1846 | 1808, 1826, 1810, 1828 |
| 1848 | 1826, 1810, 1828, 1812, 1830 |
| 1850 | 1810, 1828, 1812, 1830, 1814 |
| 1852 | 1812, 1830, 1814, 1832 |
| 1854 | 1830, 1814, 1832, 1816, 1834 |
| 1856 | 1832, 1816, 1834, 1818, 1836 |
| 1858 | 1816, 1834, 1818, 1836, 1820 |
| 1860 | 1834, 1818, 1836, 1820, 1838, 1822 |
| 1862 | 1836, 1820, 1838, 1822 |
| 1864 | 1838, 1822 |

Each element may be characterized using one or more search steps. For example, bar 1808 may be characterized using search steps 1842, 1844, and 1846. Means 1704 may keep track of the symbol elements by assigning each element an offset value corresponding to its location along the bar code symbol, where the offset value is based on the total energy signal value for the preceding elements. For example, bar 1806 of bar code symbol 1802 is the first bar in the symbol and has an offset of 0. If means 1702 generates an energy signal value equivalent to 9 modules for bar 1806 along search step 1840, then space 1824 has an offset of 9. Table III presents the offsets and energy signal values that may be generated by means 1702 for search steps 1840 through 1864. Search step 1844 begins with space 1824 having offset 8 based on the energy signal values of 8 and 9 for bar 1806 generated by means 1702 along search steps 1840 and 1842, respectively.

TABLE III

| SEARCH STEP | OFF, ELE | OFF, ELE | OFF, ELE | OFF, ELE | OFF, ELE | OFF, ELE |
|---|---|---|---|---|---|---|
| 1840 | 0,9 | 9,8 | | | | |
| 1842 | 0,8 | 8,10 | 18,8 | | | |
| 1844 | 8,9 | 17,9 | 26,4 | 30,5 | | |
| 1846 | 17,8 | 25,5 | 30,4 | 34,9 | | |
| 1848 | 26,4 | 30,5 | 35,9 | 44,4 | 48,4 | |
| 1850 | 30,5 | 35,10 | 45,4 | 49,5 | 54,9 | |
| 1852 | 44,5 | 49,4 | 53,9 | 62,9 | | |
| 1854 | 49,5 | 54,8 | 62,9 | 71,4 | 75,5 | |

TABLE III-continued

| SEARCH STEP | OFF, ELE | OFF, ELE | OFF, ELE | OFF, ELE | OFF, ELE | OFF, ELE |
|---|---|---|---|---|---|---|
| 1856 | 62,8 | 70,5 | 75,5 | 80,4 | 84,4 | |
| 1858 | 71,5 | 76,4 | 80,5 | 85,4 | 89,8 | |
| 1860 | 75,4 | 79,6 | 85,3 | 88,9 | 97,4 | 101,4 |
| 1862 | 85,4 | 89,9 | 98,4 | 102,5 | | |
| 1864 | 97,5 | 102,4 | | | | |

Since the energy signal values generated by means 1702 for each symbol element along different search steps may be different from one another, means 1704 may average the energy signal values for each element to determine a mean energy signal value to assign to that element, as presented in Table IV for the example of FIG. 18. In alternative embodiments, means 1704 may determine an energy signal value to assign to each element using other types of statistical analysis, including voting schemes.

TABLE IV

| ELEMENT | ENERGY SIGNAL VALUES | MEAN |
|---|---|---|
| 1806 | 9,8 | 8.5 |
| 1824 | 8,10,9 | 9.0 |
| 1808 | 8,9,8 | 8.3 |
| 1826 | 4,5,4 | 4.3 |
| 1810 | 5,4,5,5 | 4.8 |
| 1828 | 9,9,10 | 9.3 |
| 1812 | 4,4,5 | 4.3 |
| 1830 | 4,5,4,5 | 4.5 |
| 1814 | 9,9,8 | 8.7 |
| 1832 | 9,9,8 | 8.7 |
| 1816 | 4,5,5 | 4.7 |
| 1834 | 5,5,4,4 | 4.5 |
| 1818 | 4,5,6 | 5.0 |
| 1836 | 4,4,3,4 | 3.8 |
| 1820 | 8,9,9 | 8.7 |
| 1838 | 4,4,5 | 4.3 |
| 1822 | 4,5,4 | 4.3 |

It will be understood by those skilled in the art that aspects of the present invention may be operated in conjunction with systems that detect and decode bar code symbols using laser scanners. Those skilled in the art will realize that the present invention is not limited to processing images generated by CCD devices. For example, the present invention may be used to process images generated by a laser scanner moving perpendicular to a belt direction of travel. In addition, the concept of character tables, containing one or more choices of alphanumeric characters for each symbol character, may be used in the decoding of bar code symbols by systems having laser scanners.

As described earlier in conjunction with FIG. 1, in a preferred embodiment, means 102 of detection system 100 generates a histogram of the entire input pixel image. The histogram is then used to select thresholds for detecting state transitions between bar code symbol quiet zones and start/stop characters. The histogram is also used to select minimum and maximum pixel intensity levels used in subpixel interpolation, as described earlier in conjunction with FIGS. 14 and 15. In an alternative preferred embodiment, detection system 100 performs adaptive thresholding in which the dynamic range of pixel intensity levels is determined for every part of the image separately. In adaptive thresholding, thresholds may be adjusted while scanning or searching through the image. In this preferred embodiment, detection system 100 can process images whose dynamic ranges vary over the image areas due, for example, to nonuniform illumination.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for detecting a corner of an artifact in a two-dimensional pixel image, comprising the steps of:
  (a) selecting an original seed pixel;
  (b) specifying the original seed pixel to be a current seed pixel;
  (c) selecting a next seed pixel in accordance with the current seed pixel;
  (d) specifying the next seed pixel to be the current seed pixel;
  (e) implementing steps (c) and (d) a plurality of times to select a plurality of seed pixels;
  (f) generating a reference vector in accordance with the original seed pixel and a seed pixel of the plurality of seed pixels;
  (g) generating a plurality of vectors in accordance with the plurality of seed pixels;
  (h) comparing each of the plurality of vectors to said reference vector; and
  (i) detecting a corner in accordance with said comparison.

2. The method of claim 1, wherein step (h) comprises the step of determining the magnitude of the vector difference between said reference vector and each of the plurality of vectors and wherein step (i) comprises the step of comparing said magnitude to a threshold magnitude.

3. The method of claim 1, wherein step (h) comprises the step of determining the phase angle between said reference vector and each of the plurality of vectors and wherein step (i) comprises the step of comparing said phase angle to a threshold.

4. An apparatus for detecting a corner of an artifact in a two-dimensional pixel image, comprising:
  (a) means for selecting an original seed pixel;
  (b) means for specifying the original seed pixel to be a current seed pixel;
  (c) seed pixel selecting means for selecting a next seed pixel in accordance with the current seed pixel;
  (d) means for specifying the next seed pixel to be the current seed pixel;
  (e) means for selecting a plurality of seed pixels using means (c) and (d);
  (f) means for generating a reference vector in accordance with the original seed pixel and a seed pixel of the plurality of seed pixels;
  (g) means for generating a plurality of vectors in accordance with the plurality of seed pixels;

(h) comparing means for comparing each of the plurality of vectors to said reference vector; and (i) corner detecting means for detecting a corner in accordance with said comparison.

5. The apparatus of claim 4, wherein said comparing means determines the magnitude of the vector difference between said reference vector and each of the plurality of vectors and wherein said corner detecting means compares said magnitude to a threshold magnitude.

6. The apparatus of claim 4, wherein said comparing means determines the phase angle between said reference vector and each of the plurality of vectors and wherein said corner detecting means compares said phase angle to a threshold.

7. A method for detecting a corner of a bar code symbol in a two-dimensional pixel image, comprising the steps of:

(a) selecting a sequence of seed pixels, said sequence comprising a first seed pixel and a plurality of successive seed pixels, each successive seed pixel being selected in accordance with the previous seed pixel in said sequence;

(b) generating a reference vector in accordance with said first seed pixel and one of the plurality of successive seed pixels;

(c) generating a plurality of successive vectors, each successive vector being in accordance with at least two of the successive seed pixels;

(d) comparing said reference vector to each of said successive vectors;

(e) detecting a corner in accordance with said comparison.

8. The method of claim 7, wherein step (d) comprises the step of determining the magnitude of the vector difference between said reference vector and each of said successive vectors and wherein step (e) comprises the step of comparing said magnitude to a threshold magnitude.

9. The method of claim 7, wherein step (d) comprises the step of determining the phase angle between said reference vector and each of said successive vectors and wherein step (e) comprises the step of comparing said magnitude to a threshold.

10. An apparatus for detecting a corner of a bar code symbol in a two-dimensional pixel image, comprising:

(a) seed pixel selecting means for selecting a sequence of seed pixels, said sequence comprising a first seed pixel and a plurality of successive seed pixels, each successive seed pixel being selected in accordance with the previous seed pixel in said sequence;

(b) means for generating a reference vector in accordance with said first seed pixel and one of the plurality of successive seed pixels;

(c) means for generating a plurality of successive vectors, each successive vector being in accordance with at least two of said successive seed pixels;

(d) comparing means for comparing said reference vector to each of said successive vectors;

(e) corner detecting means for detecting a corner in accordance with said comparison.

11. The apparatus of claim 10, wherein said comparing means determines the magnitude of the vector difference between said reference vector and each of said successive vectors and wherein said corner selecting means compares said magnitude to a threshold magnitude.

12. The apparatus of claim 10, wherein said comparing means determines the phase angle between said reference vector and each of said successive vectors and wherein said corner selecting means compares said magnitude to a threshold.

* * * * *